United States Patent [19]

Barwick et al.

[11] Patent Number: 4,777,610

[45] Date of Patent: Oct. 11, 1988

[54] THICKNESS MONITOR

[75] Inventors: Daniel L. Barwick, Palmyra; Dennis H. Chestnut, Harrisburg; Timothy W. Jones; John P. Weaver, both of Lancaster, all of Pa.

[73] Assignee: AMP Incorporated, Harrisburg, Pa.

[21] Appl. No.: 821,645

[22] Filed: Jan. 23, 1986

[51] Int. Cl.$^4$ .................. G06F 15/46; G01B 11/10
[52] U.S. Cl. .................. 364/563; 364/561; 364/469; 356/386; 250/224
[58] Field of Search ............ 364/173, 563, 571, 561, 364/562, 469; 356/373, 375, 386; 73/15, 863; 250/201, 224, 561; 360/83, 94, 130.2, 85

[56] References Cited

U.S. PATENT DOCUMENTS

| | | | |
|---|---|---|---|
| 1,001,644 | 8/1911 | Hutchings | 29/264 |
| 2,107,451 | 2/1938 | Oppenlaender | 18/8 |
| 3,333,753 | 8/1967 | Streets | 226/97 |
| 3,984,679 | 10/1976 | Lublin et al. | 364/571 |
| 4,017,897 | 4/1977 | Blanding | 360/85 |
| 4,063,820 | 12/1977 | Borgese | 250/224 |
| 4,162,528 | 7/1979 | Maidonado et al. | 364/571 |
| 4,192,612 | 3/1980 | Bodlaj | 250/224 |
| 4,264,202 | 4/1981 | Gugliotta et al. | 250/561 |
| 4,393,313 | 7/1983 | Calkins et al. | 356/386 |
| 4,441,133 | 4/1984 | Ogawa et al. | 360/130.22 |
| 4,510,577 | 4/1985 | Tsujii et al. | 364/571 |
| 4,553,217 | 11/1985 | Daudt et al. | 364/562 |

Primary Examiner—Parshotam S. Lall
Assistant Examiner—Kevin J. Teska
Attorney, Agent, or Firm—Katherine A. Nelson

[57] ABSTRACT

An X-ray thickness monitor is mounted on a moveable carriage which also supports a duty cycle sensor and a shoulder find sensor. The duty cycle sensor is aligned to scan the same portion of a terminal strip as that which passes under the X-ray beam. The duty cycle sensor is used to measure the ratio between the widths of individual terminals in the terminal strip and the period between adjacent terminals. This duty cycle is then used as a correction factor to correct the measured thickness value in order to compensate for gaps between adjacent terminals. The shoulder find sensor monitors the duty cycle at a shoulder on the terminal and moves the carriage as necessary to maintain the shoulder find sensor in position over the shoulder, thereby maintaining the X-ray beam and the duty cycle sensor in position over the crown to be measured. The X-ray monitor is automatically standardized periodically in order to ensure the accuracy of the measurement.

35 Claims, 20 Drawing Sheets

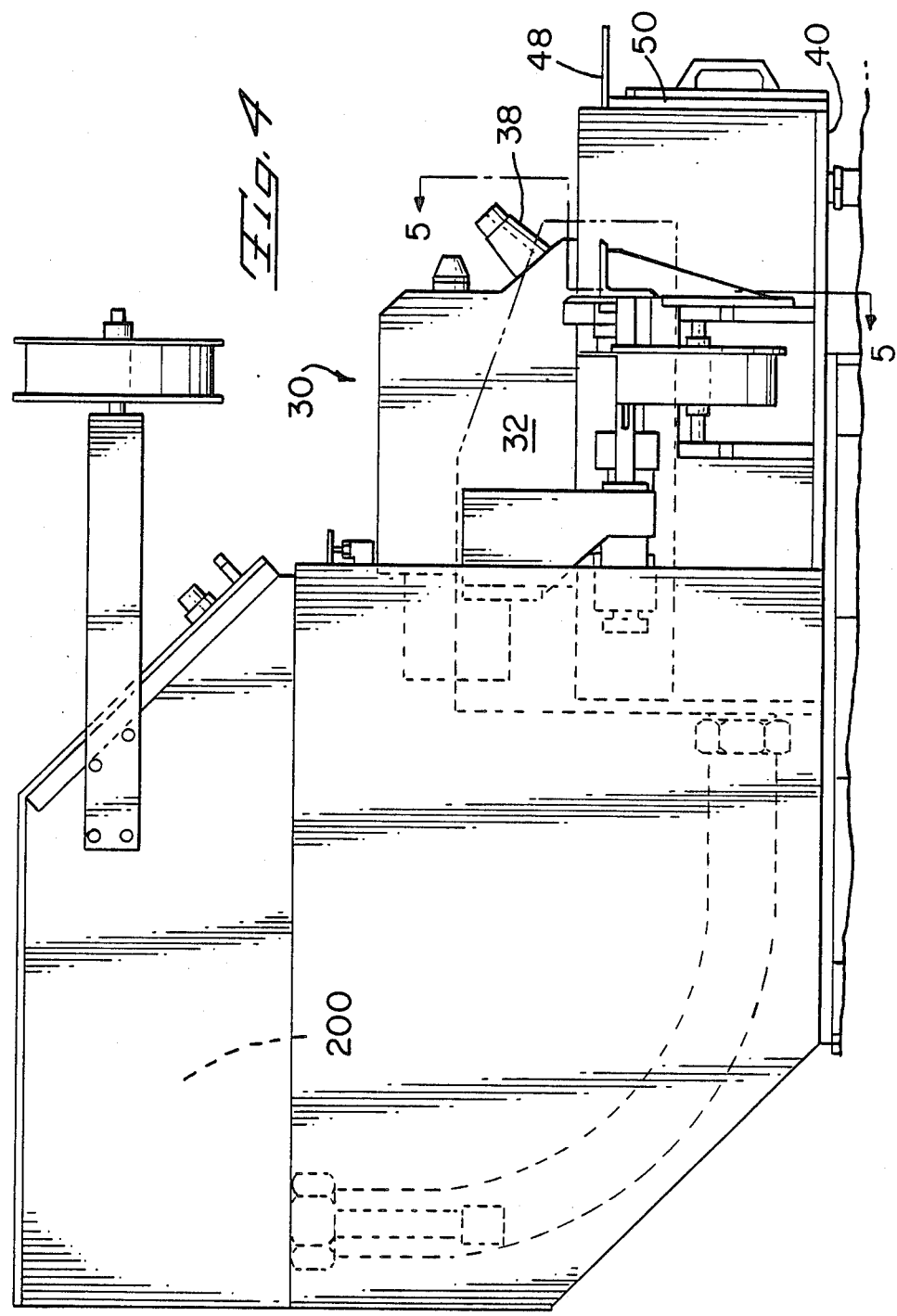

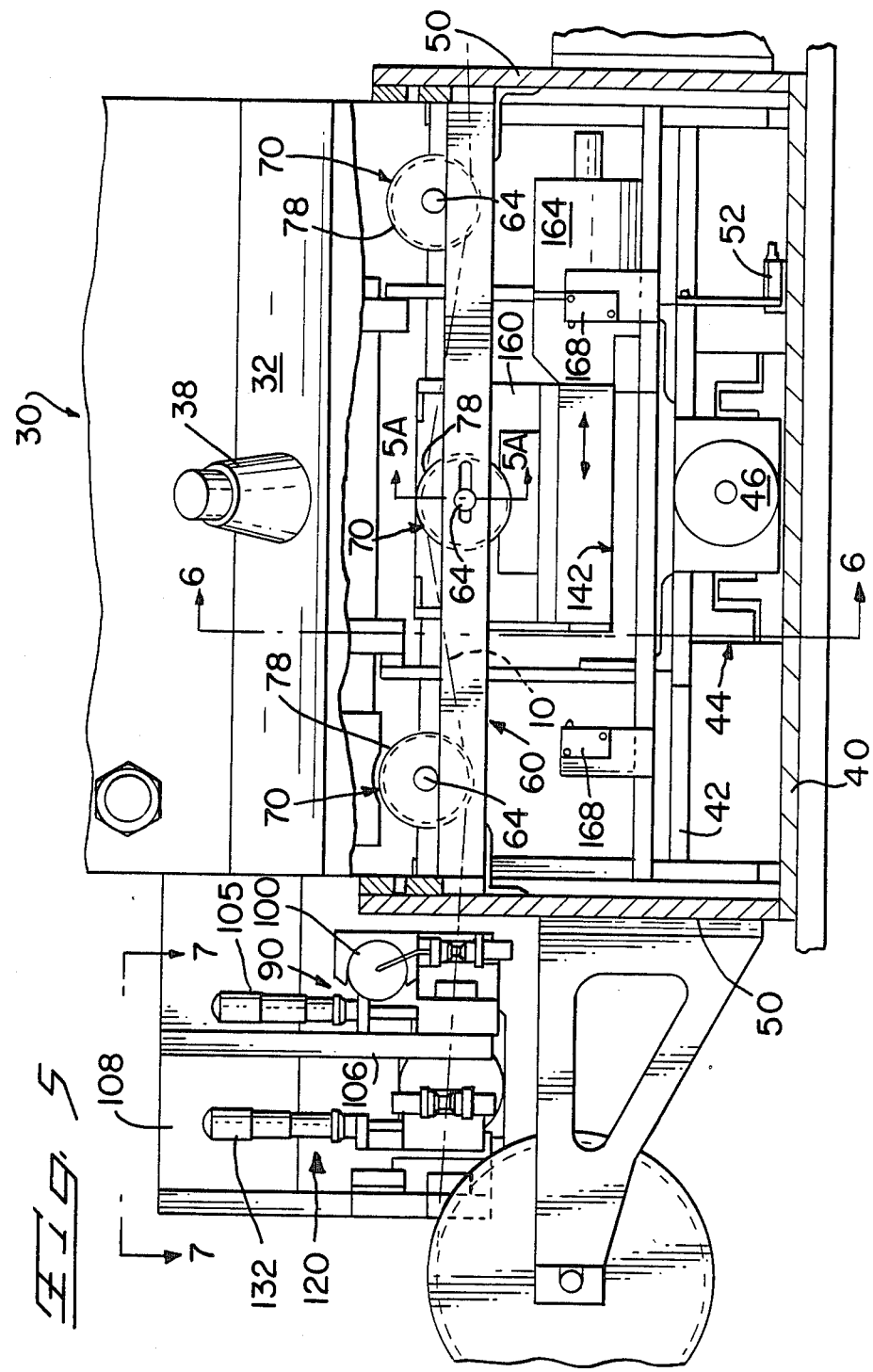

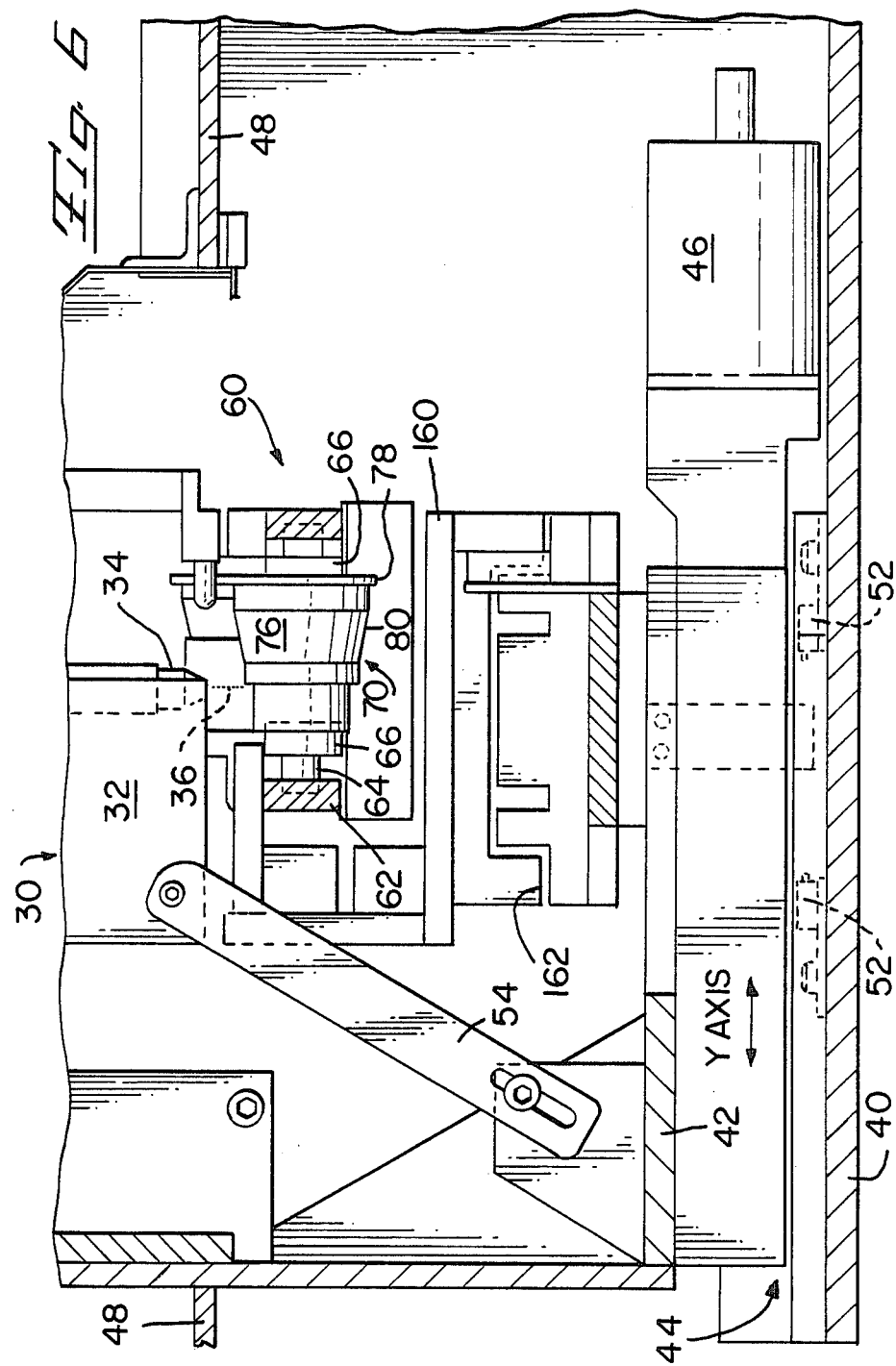

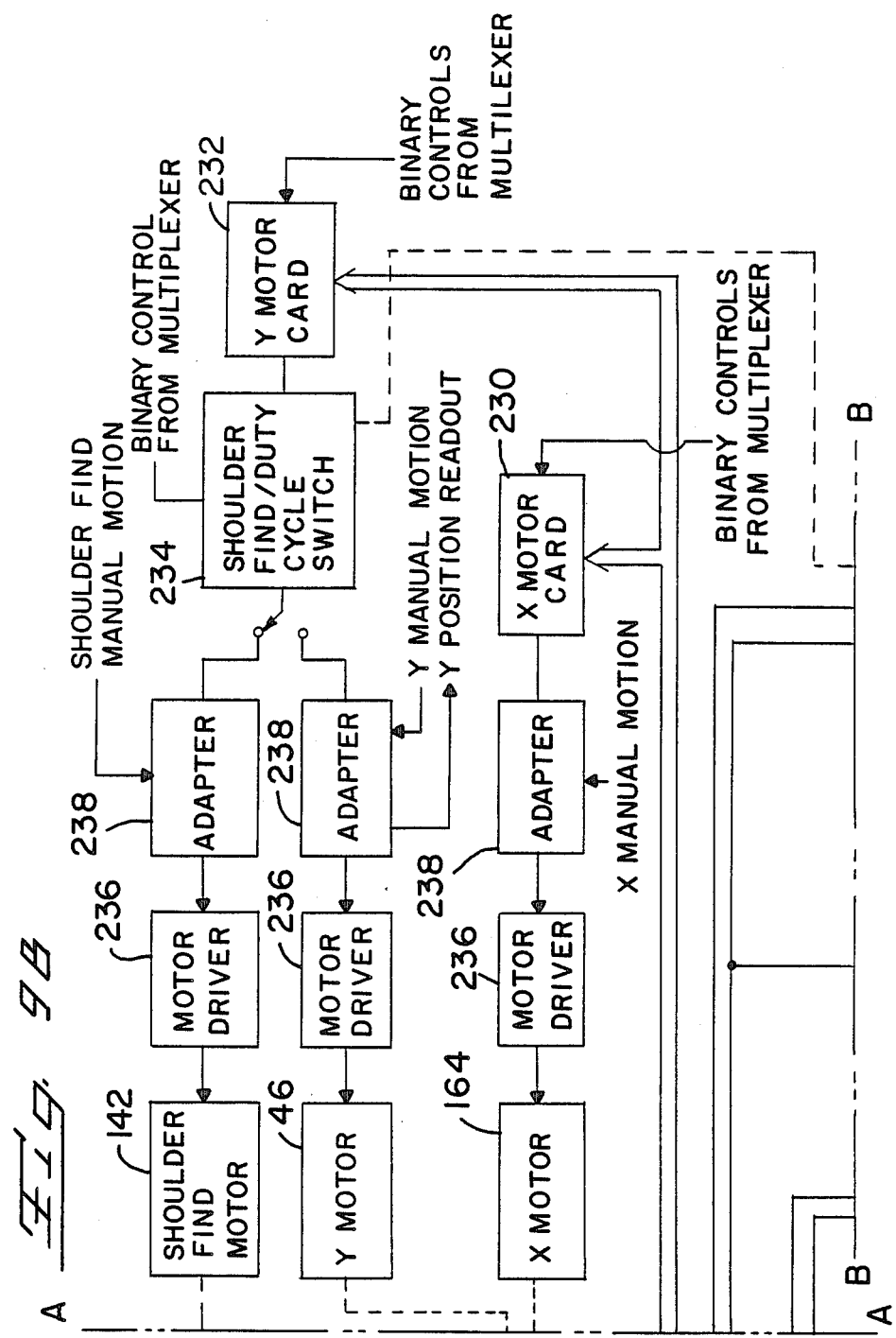

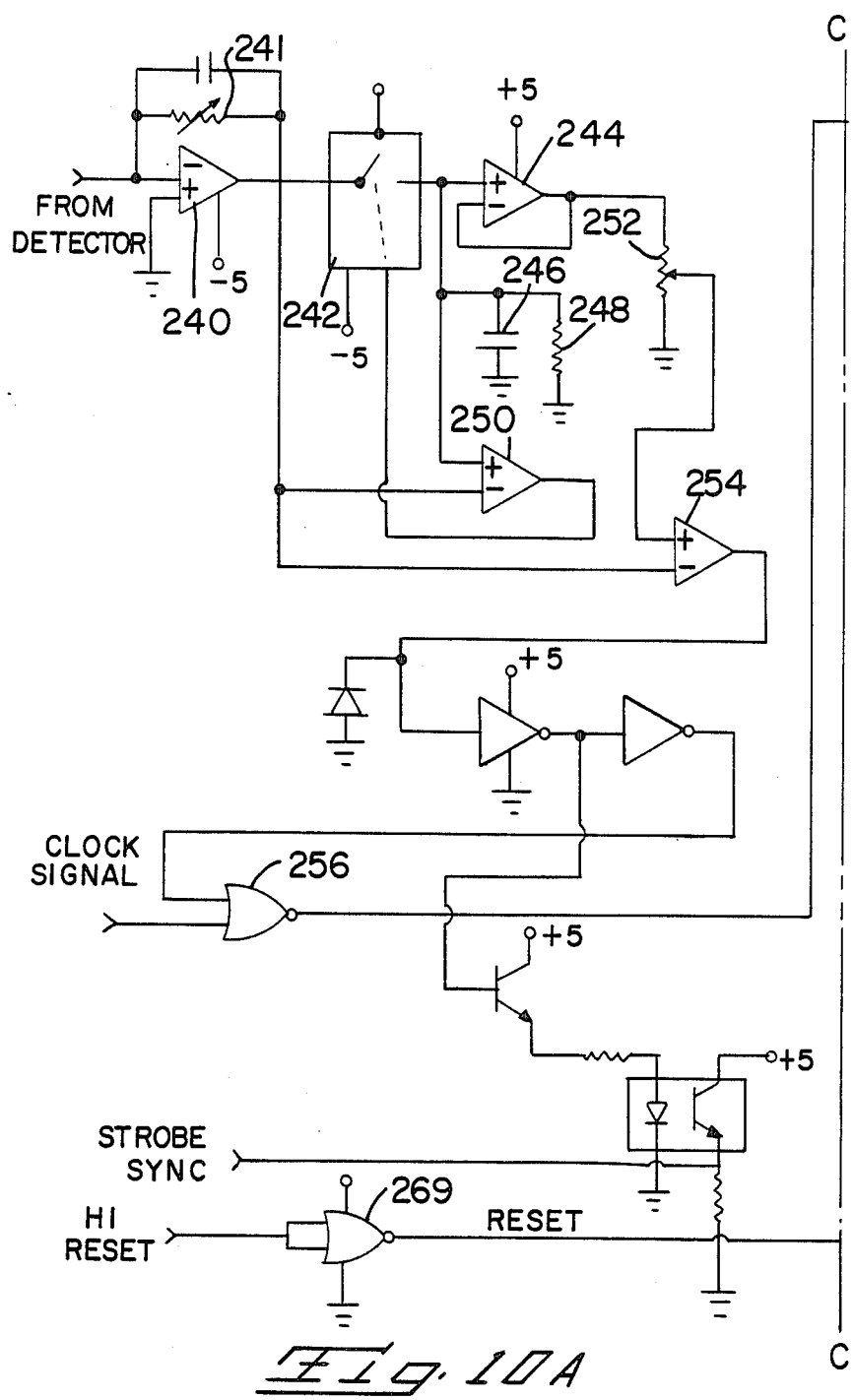

THICKNESS MONITOR

BACKGROUND OF THE INVENTION

The present invention relates to measuring and positioning systems which can be used to improve the precision and accuracy with which the thickness of a plating layer can be measured.

In the past, X-ray thickness monitors have been used to measure the thickness of a plating layer such as a gold plating layer on components. U.S. Pat. No. 3,984,679 (Lublin) discloses one such thickness monitor.

The general approach used with such X-ray thickness monitors is to direct a small diameter X-ray beam onto the plating layer to be measured. The incident X-ray beam stimulates secondary X-ray emission which is then detected. The intensity of this secondary X-ray emission or X-ray fluorescence varies as a function of the thickness of the plating layer.

When this approach is used to measure the plating thickness layer of a moving terminal strip made up of an array of spaced terminals, two significant problems arise. The first is that individual terminals are separated by open space. Of course, this open space does not produce secondary X-rays characteristic of the plating layer, and the count of secondary X-rays detected during a measuring interval is therefore affected by the ratio between the width of the terminals and the width of the empty space between terminals.

In the past, this problem has been addressed by measuring the width of the empty space between adjacent terminals on a periodic basis and correcting the measured thickness as a function of the stored ratio between the width of the terminals and the width of the spacing between terminals. However, it has been found that this ratio varies significantly between terminals made with different dies and even between terminals made with a single die at different times. Furthermore, this approach cannot account for intermittent variations in the measurement duty cycle, caused by example by missing terminals. Thus, an occasional measurement of the ratio between the width of the terminals and the separation between adjacent terminals is not entirely satisfactory.

A second important problem in thickness measurements of the type described above is positioning the X-ray beam properly on the terminals. In modern plating operations for electrical terminals, plating layers such as gold layers are often applied only at desired regions of the termina. If the X-ray thickness measurement is not centered properly on these plating layers, the thickness measurement is of course inaccurate. Because the position of the desired measurement location is often not precisely controlled with respect to the carrier strip on which the terminals are mounted, optimum results cannot be achieved by simply positioning the X-ray beam at a predetermined separation from the carrier strip.

SUMMARY OF THE INVENTION

The preferred embodiments described below provide an improved X-ray thickness monitor which automatically (1) corrects the thickness measurement as a function of the measured ratio between the width of the terminals and the separation between adjacent terminals and (2) positions the X-ray beam properly with respect to the terminals. However, it should be clearly understood that the systems described below are not limited to use in X-ray thickness monitors, but can rather be applied in other systems in which it is important to be able to determine component width.

According to a first aspect of this invention, a system for monitoring an array of spaced components comprises a sensor positioned adjacent to the components to generate a sensor signal which is in a first state when any one of the components is present at a selected location and is in a second state when none of the components is present at the selected location. Means are provided for creating relative movement along a transport axis between the sensor and the components such that multiple ones of the components move across the selected location successively, and means are provided which respond to the sensor signal to generate an additional signal which varies in accordance with the width of the components parallel to the transport axis.

In the preferred embodiment described below, the additional signal is a duty cycle signal indicative of the proportion of a measuring interval during which the sensor signal is in the first state. In this embodiment, the spaced components are terminals, and the duty cycle signal is used to correct or compensate a measurement of the thickness of a plating layer on the terminals. In this way, the thickness measurement is made independent of the width of empty spaces or gaps between adjacent terminals. Because the duty cycle signal is measured on an ongoing basis, variations in the width of the gaps between adjacent terminals (caused for example by die wear or substitution of dies) does not adversely affect the accuracy of the thickness measurement.

According to a second aspect of this invention, a system of the type comprising means for passing an array of spaced components along a transport axis is provided with sensor means for generating a sensor signal indicative of a measured width of the components at a sensing point. Means are provided for comparing the sensor signal with a stored signal indicative of a target width, and for generating a control signal in response to the comparison. Means are provided for moving the sensing point along the components in response to the control signal to cause the measured width to approach the target width, thereby automatically maintaining the sensing point at a first selected location on the components.

In the preferred embodiment described below, an X-ray thickness monitor is moved along with the sensor and the X-ray beam of the monitor is kept at a selected separation from the sensor. This selected separation is chosen such that the feedback system which centers the sensor on the selected locations automatically positions the X-ray beam properly over the part of the terminal to be measured.

The invention itself, together with further objects and attendant advantages, will best be understood by reference to the following detailed description, taken in conjunction with the accompanying drawings.

BRIEF DESCRIPTION OF THE DRAWINGS

FIG. 4 is a side elevation taken along line 4—4 of FIG. 3.

FIG. 5 is a section along line 5—5 of FIG. 4.

FIG. 6 is a section taken along line 6—6 of FIG. 5.

DETAILED DESCRIPTION OF THE PRESENTLY PREFERRED EMBODIMENTS

Figure 1:
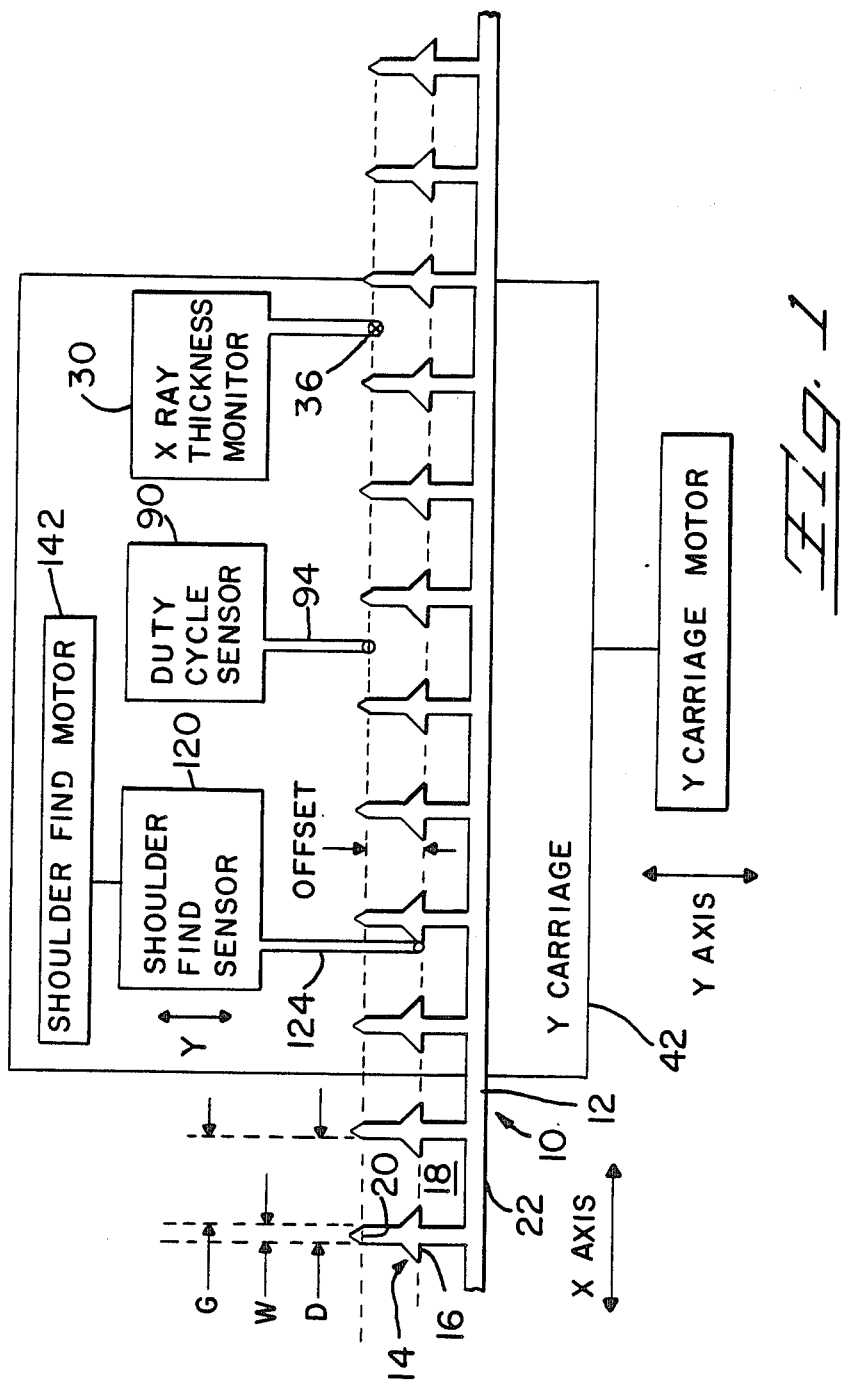
FIG. 1 is a schematic view of portions of the presently preferred embodiment of this invention.
Figure 2:
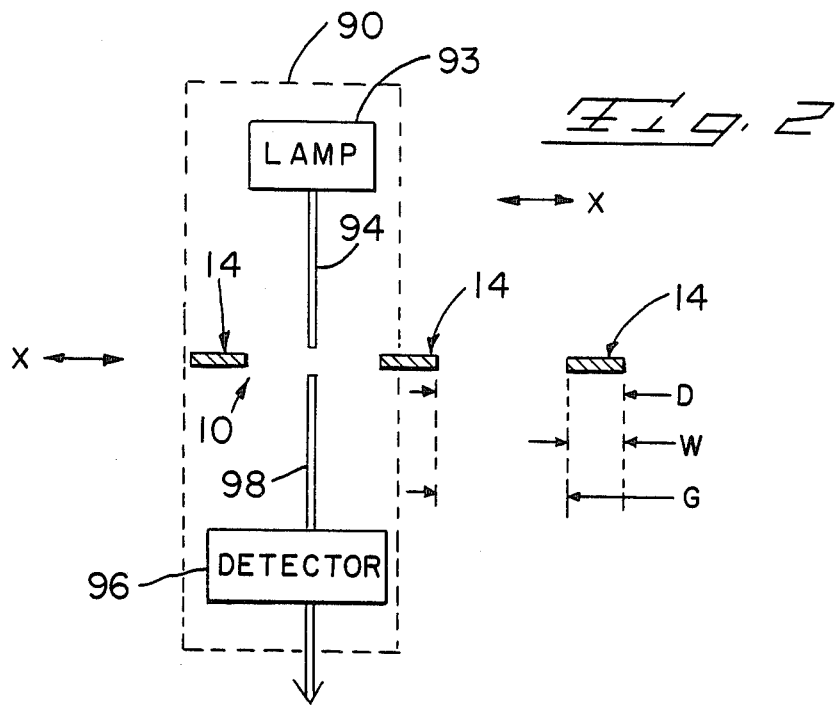
FIG. 2 is a schematic view of the duty cycle sensor of the embodiment of FIG. 1.

Turning now to the drawings, FIGS. 1 and 2 will be used to explain general principles of operation of the preferred embodiment of this invention, and the remaining figures and flowcharts will then be used to describe this embodiment in greater detail.

As shown schematically in FIGS. 1 and 2, the presently preferred embodiment of this invention is adapted for use in a system which measures the thickness of a plating layer on an array of terminals 14. The terminals 14 are mounted at one end to a carrier strip 12 to form a terminal strip 10. Each of the terminals 14 defines a shoulder 16, at which point the width of the terminal 14 as measured in the X axis changes abruptly. In addition, each of the terminals 14 defines a crown 20 which is plated with a material such as gold. Individual terminals 14 are separated by intervening open spaces or gaps 18. In the following discussion, the symbol D will be used to represent the period of the terminal strip 10, the symbol W will be used to represent the width or distance between the leading and trailing edges of one of the terminals 14 at a given point along its length, and the symbol G will be used to represent the width of the gap 18 between the trailing edge of one terminal 14 and the leading edge of an adjacent terminal 14, at this predetermined point along the length of the terminal 14. FIG. 1 clarifies these three symbols.

The presently preferred embodiment includes a conventional X-ray thickness monitor 30 which generates a collimated X-ray beam 36 and detects X-ray fluorescence to measure the thickness of the plating layer on the crown 20 in the conventional manner.

As shown in FIG. 1, this embodiment includes a duty cycle sensor 90 and a shoulder find sensor 120. Both of the sensors 90 and 120 operate according to the general principle shown in FIG. 2. In FIG. 2 the terminal strip 10 is shown edge on and individual terminals 14 are shown in cross section. The duty cycle sensor 90 includes a lamp 93 which directs a collimated beam of light at the terminals 14 via a fiber optic cable 94. A detector 96 is positioned on the opposite side of the terminal strip 10, and the detector 96 detects light entering the fiber optic cable 98. The terminal strip 10 is positioned such that individual ones of the terminals 14 move between the two fiber optic cables 94, 98. Thus the output signal of the detector 96 indicates for any given time whether one of the terminals 14 is interposed between the two fiber optic cables 94, 98. As the carrier strip 10 moves in the X direction, light directed by the lamp 93 and the fiber optic cable 94 is alternately blocked from reaching the detector 96 by one of the terminals 14 and permitted to reach the detector 96. The shoulder find sensor 120 operates in a similar manner.

The shoulder find sensor 120, the duty cycle sensor 90, and the X-ray thickness monitor 30 are all mounted on a Y carriage 42 which is moveable in the Y axis by a Y motor 46. The duty cycle sensor 90 is aligned with the X-ray thickness monitor 30 such that the same portion of the terminals 14 which are measured by the duty cycle sensor 90 also pass under the X-ray beam 36 and are measured by the X-ray thickness monitor 30. The duty cycle sensor 90 is used in measure the ratio W/D during a measuring interval. This ratio, sometimes referred to as the duty cycle herein, is indicative of the fraction of the time that the X-ray beam 36 is aligned with the crowns 20.

As explained above, when one of the gaps 18 is aligned with the X-ray beam 36, no secondary X-rays characteristic of the plating layer on the crown 20 are emitted. For this reason, the uncorrected thickness measurement is less than the actual thickness of the plating layer by a factor equal to the duty cycle W/D. By multiplying the measured plating thickness determined by the X-ray thickness monitor 30 by the inverse of the duty cycle W/D, the measured plating thickness can be corrected such that the thickness measurement is independent of the width of the gaps 18.

The shoulder find sensor 120 is aligned with the shoulders 16. The duty cycle W/D measured by the shoulder find sensor 120 is a strong function of the position of the shoulder find sensor 120 along the Y axis. Moving away from the carrier strip 20, the duty cycle W/D increases abruptly at the shoulder 16. The preferred embodiment described below includes means for comparing the duty cycle measurement obtained with the shoulder find sensor 120 with a pre-determined target value, and for controlling the Y motor 46 so as to maintain the measured duty cycle at the target value. Once the proper offset between the shoulder find sensor 120 and the X-ray beam 36 has been selected, the X-ray beam 36 can be properly positioned over the crown 20 by ensuring that the shoulder find sensor 120 is properly positioned over the shoulder 16.

The offset between the shoulder 16 and the crown 20 will of course vary depending upon the particular design of the terminal strip 10. However, for any single design of the terminal strip 10, this offset is precisely controlled in manufacture. For this reason, the shoulder 16 represents an excellent reference point for properly positioning the X-ray beam 36. Thus, the preferred embodiment described below operates automatically both to correct the thickness measurement for variations in the gap 18 between adjacent terminals, and to position the X-ray beam properly on the crown 20 to be measured.

Turning now to FIGS. 3-8, the mechanical structure of the preferred embodiment of FIGS. 1 and 2 will be described in greater detail. As shown in FIGS. 3-6, the X-ray thickness monitor 30 includes an outerhousing 32. X-ray beam collimator 34 protrudes from the housing 32, and the X-ray beam 36 issues from the collimator 34 as shown in FIG. 6. A microscope 38 is mounted to the housing 32 to allow an operator to determine visually the location of the X-ray beam 36. Suitable X-ray thickness monitors are well known to those skilled in the art, and the design, structure, and operation of the thickness monitor 30 does not from part of this invention. For example, a thickness monitor such as that marketed by Daini Seikosha Company Ltd. as Seiko Model SFT-156 has been found to be suitable for use with this invention.

As shown in FIG. 6, this preferred embodiment includes a frame 40 which supports a Y axis guide 44. In this embodiment, the Y axis is oriented horizontally, transverse to the edge 22 of the carrier strip 12. The Y carriage 42 is mounted on the Y guide 44 such that the Y carriage 42 is guided in translation along the Y axis. A stepper motor 46 is mounted to the frame 40 to move the Y carriage 42 in the Y guide 44. The frame 40 includes side walls 50 as shown in FIG. 5, which extend up around the Y guide 44. A pair of top flanges 48 are mounted to the Y carriage 42 as shown in FIG. 6 to provide a sliding seal between the Y carriage 42 and the side walls 50, without interfering with the sliding motion of the Y carriage 42. A pair of limit switches 52 are mounted to the frame 40 to limit travel of the Y carriage 42. A brace 54 is used to minimize vibration of the X-ray thickness monitor 30 on the Y carriage 42. Interlock switches (not shown) are used to ensure tht the X-ray beam is turned off wherever any part of the housing 32 or the frame 40 that would allow access to the X-ray beam is removed.

Figure 5A:
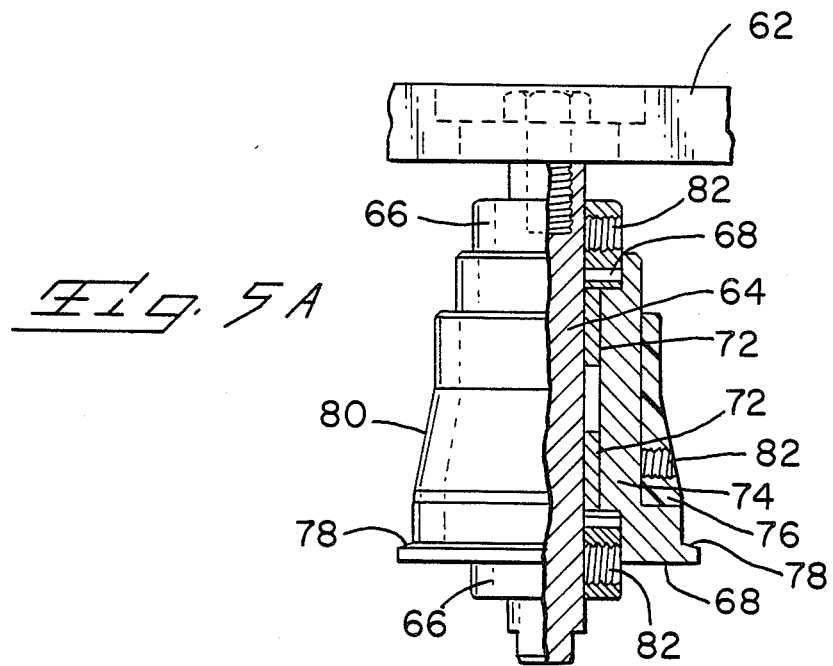
FIG. 5A is a section along line 5A—5A of FIG. 5.
Figure 3:
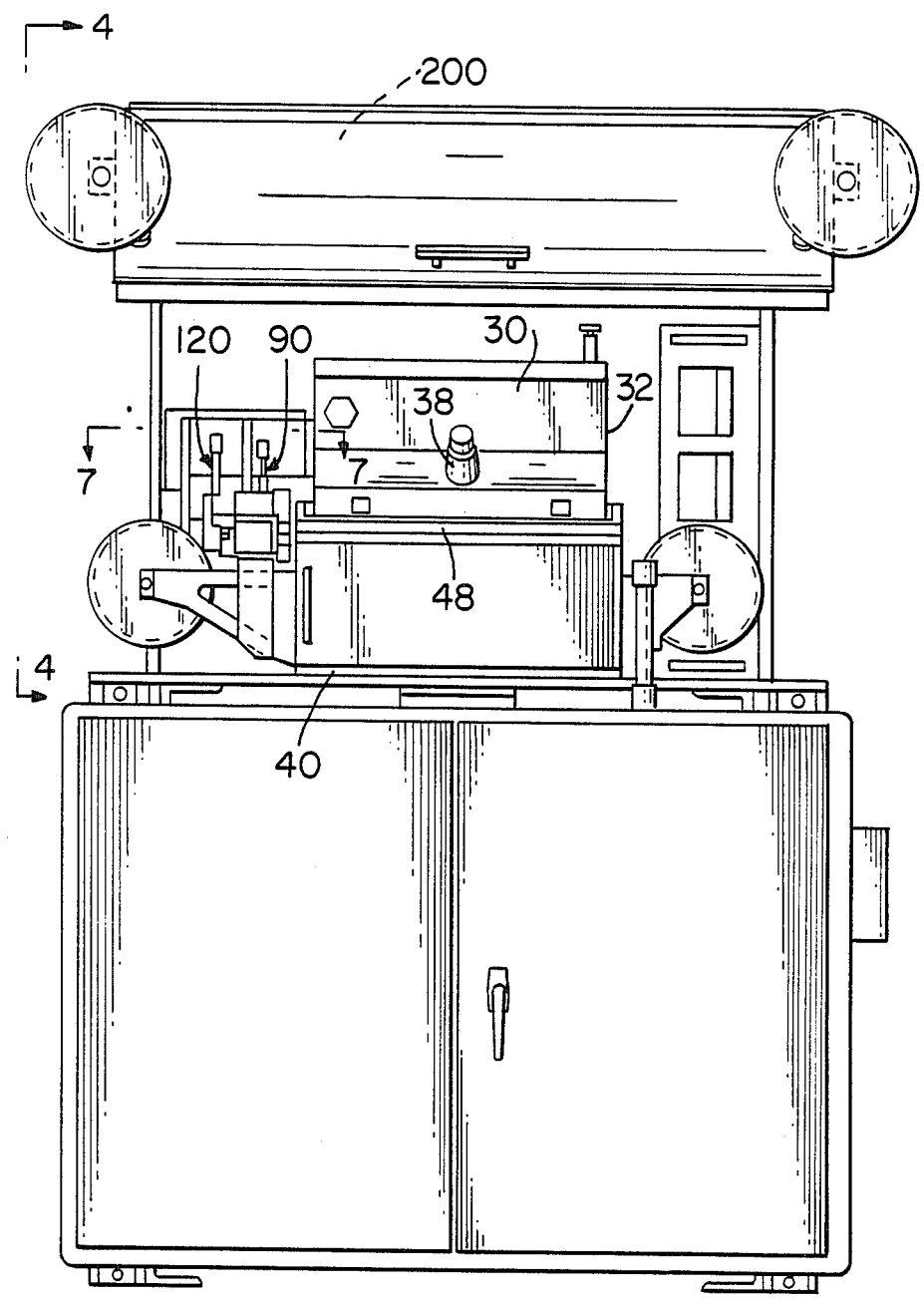
FIG. 3 is a front elevation of an X-ray thickness monitor which incorporates the preferred embodiment of FIG. 1.

A guide roller assembly 60 is mounted to the frame 40 to guide the terminal strip 10 as it moves under the X-ray beam 36. This guide roller assembly 60 is best shown in FIGS. 5, 5A and 6 and includes a horizontally oriented support bar 62 which supports three parallel shafts 64. Each of the shafts 64 supports a respective roller 70 via needle bearings 72. Two spaced collars 66 are secured to each of the shafts 64 in order to define the position of the rollers 70 along the shafts 64. Thrust bearings 68 minimize friction between the rollers 70 and the collars 66. The two outer rollers 70 are formed of a solid metal such as aluminum. The central roller 70 which is aligned with the X-ray collimator 34 is formed of a central metallic core 74 surrounded by a sleeve 76. The sleeve 76 is preferably formed of a low density material which minimizes X-ray fluorescence or scattering. In this embodiment, the sleeve 76 is formed of a plastic such as Zytel 42, a type of nylon 6.6. Each of the rollers 70 defines a respective flange 78 and a respective sloped surface 80. The sloped surfaces 80 cause the terminal strip 10 to seat firmly against the flanges 78, with the edge 22 in firm contact with the flanges 78. In this way, the terminal strip 10 is reliably and reproducibly positioned with respect to the X-ray collimator 34. Set screws 82 are used to hold the collars 66 and the sleeve 76 in place. Because the terminal strip 10 is moved in the X direction by equipment external to this embodiment, each of the rollers 70 is allowed to rotate freely on the respective shaft 64.

Figure 7:
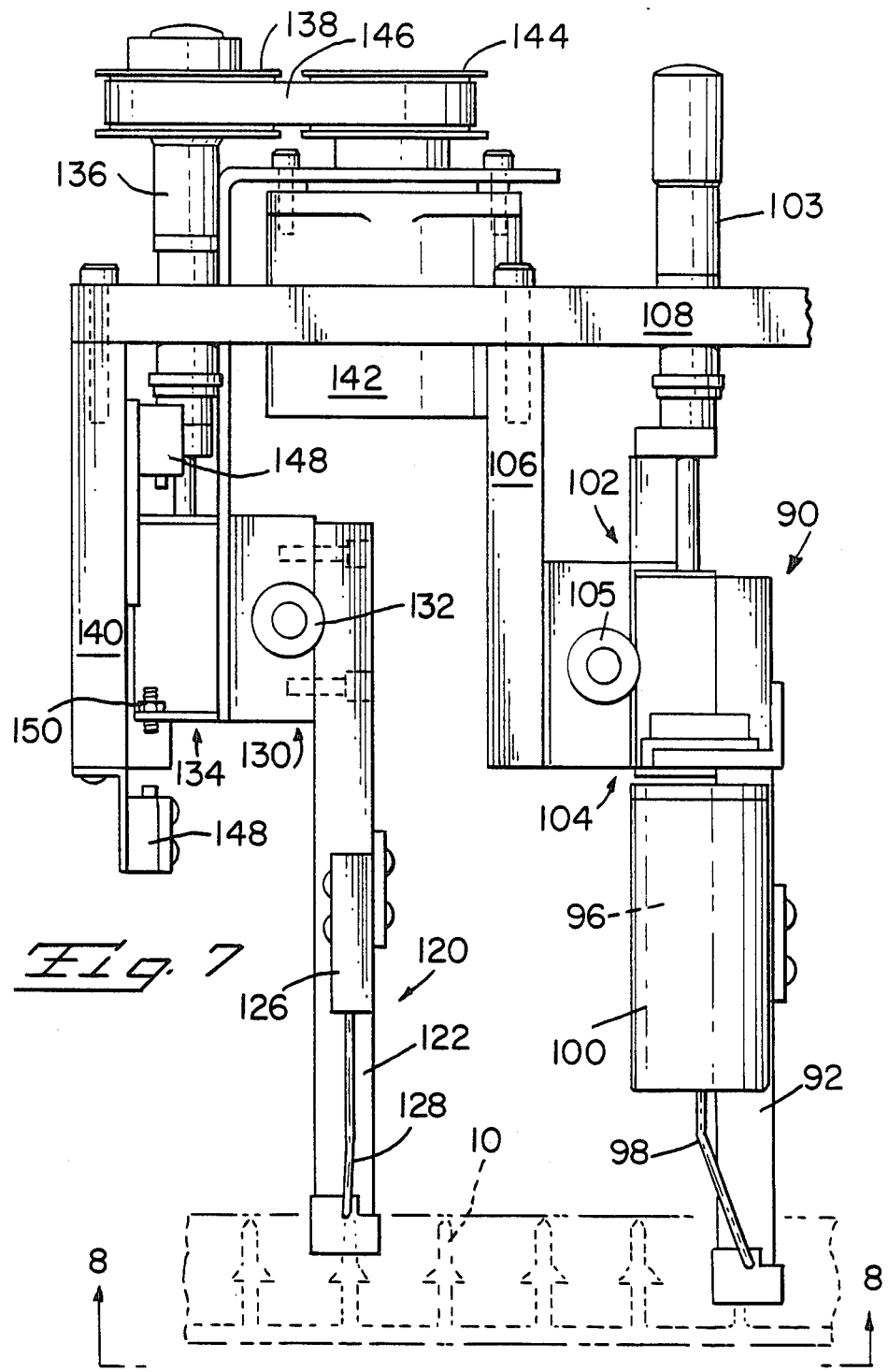
FIG. 7 is a plan taken along line 7—7 of FIG. 5.
Figure 8:
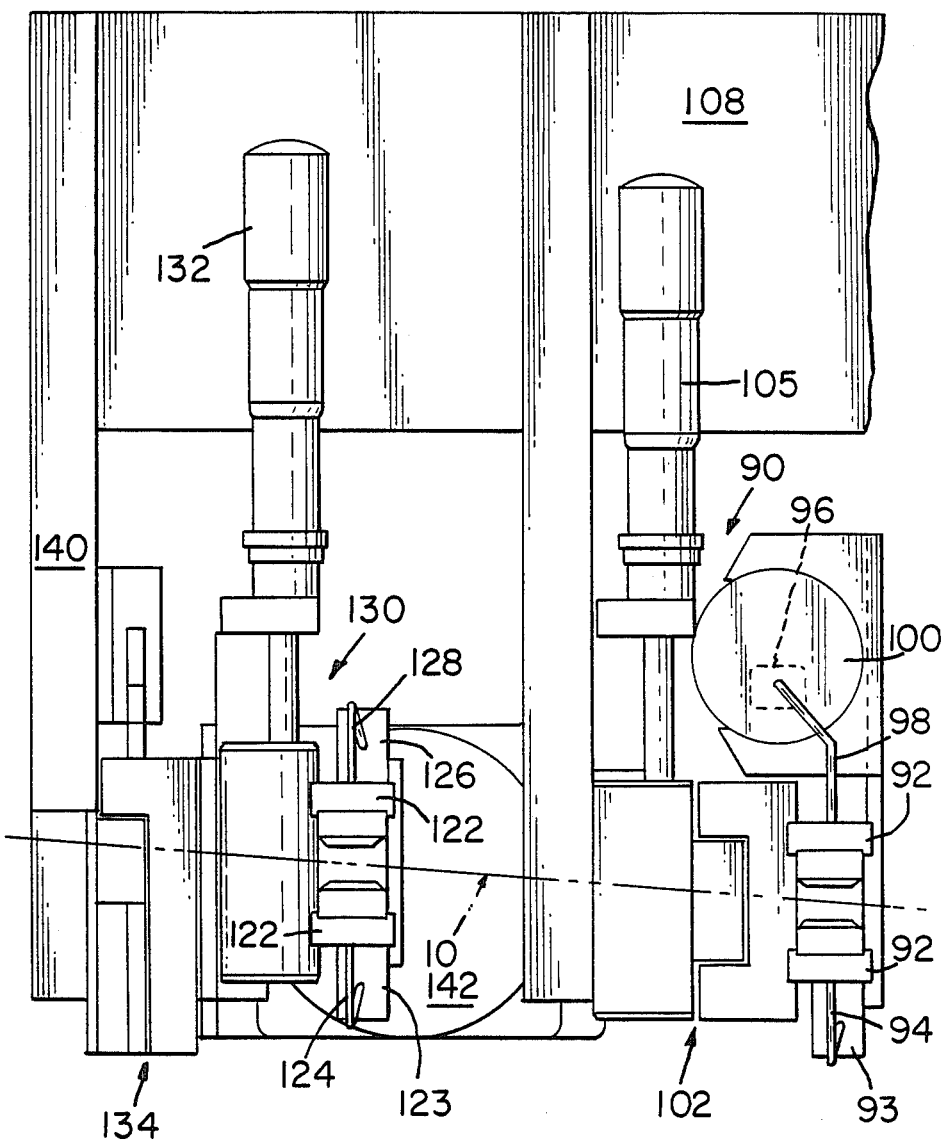
FIG. 8 is an elevation taken along line 8—8 of FIG. 7.

Turning now to FIGS. 7 and 8, the duty cycle sensor 90 includes a fork 92. The lamp 93 and fiber optic cable 94 are mounted on one side of the fork 92, and the detector 96 and fiber optic cable 98 are mounted on the other side of the fork 92. If desired, the detector 96 can be placed within a constant temperature oven 100 in order to reduce variations in detector sensitivity caused by temperature fluctuations. In this embodiment the lamp 93 and fiber optic cable 94 produce a sensing beam with a cross sectional diameter of 0.02 inches, and the separation between the exposed ends of the fiber optic cables 94, 98 is about one-quarter of an inch. The fork 92 is mounted on an Y axis translation stage 102 which is manually controlled by a micrometer 103. The Y axis translation stage 102 is in turn mounted to a Z axis translation stage 104 which is also manually controlled via a micrometer 105. The Z axis translation stage 104 is mounted via mounting plates 106, 108 to the Y carriage 42. The micrometers 103, 105 are used to position the fork 92 properly such that the terminal strip 10 passes between the exposed ends of the two fiber optic cables 94, 98, and to insure that the duty cycle sensor 90 monitors the same portion of the contact 20 as that which passes under the X-ray beam 36. Once properly positioned, the duty cycle sensor 90 remains fixed on the Y carriage 42 in alignment with the X-ray beam 36.

The shoulder find sensor 120 is similar in many respects to the duty cycle sensor 90. The shoulder find sensor 120 includes a fork 122, a lamp 123, a detector 126, and fiber optic cables 124, 128, similar to those described above. The fork 122 is mounted on a Z axis translation stage 130 which includes a manually operated micrometer 132 that can be used to center the fork 122 on the terminal strip 10. The Z axis translation stage 130 is in turn mounted on a Y axis translation stage 134. The position of the Y axis translation stage 134 is controlled by a micrometer 136, and a pulley 138 is mounted on the outer end of the micrometer 136. The Y axis translation stage 134 is mounted via a mounting plate 140 to the mounting plate 108 such that the Y axis translation stage 134 moves with the duty cycle sensor 90 and the X-ray thickness monitor 30 on the Y carriage 42. A stepper motor 142 is mounted to the mounting plate 108, and the stepper motor 142 rotates a drive pulley 144. A gear belt 146 interconnects the drive pulley 144 and the pulley 138 such that rotation of the stepper motor 142 rotates the micrometer 136. As explained in detail below, the stepper motor 142 is controlled to adjust the separation in the Y direction between the shoulder find sensor 120 and the X-ray beam 36. Limit switches 148 are mounted to the mounting plate 140, and an adjustable set screw 150 is mounted to move with the Y axis translation stage 134. The limit switches 148 cooperate with the set screw 150 to define the limits of travel of the Y axis translation stage 134 and to define the zero or reference position for the Y axis translation stage 134.

Turning now to FIGS. 5 and 6, this embodiment includes a standard carriage 160 which is mounted via an X axis guide 162 to the frame 40. The X axis guide 162 is oriented parallel to the X or transport axis along which the terminal strip 10 moves. The position of the standard carriage 160 in the X axis guide 162 is controlled by a stepper motor 164. Limit switches 168 define the limits of travel of the standard carriage 160 and define the zero or reference position of the standard carriage 160. The standard carriage 160 supports a number of standards that are used in the calibration of the X-ray monitor 30.

Figure 9A:
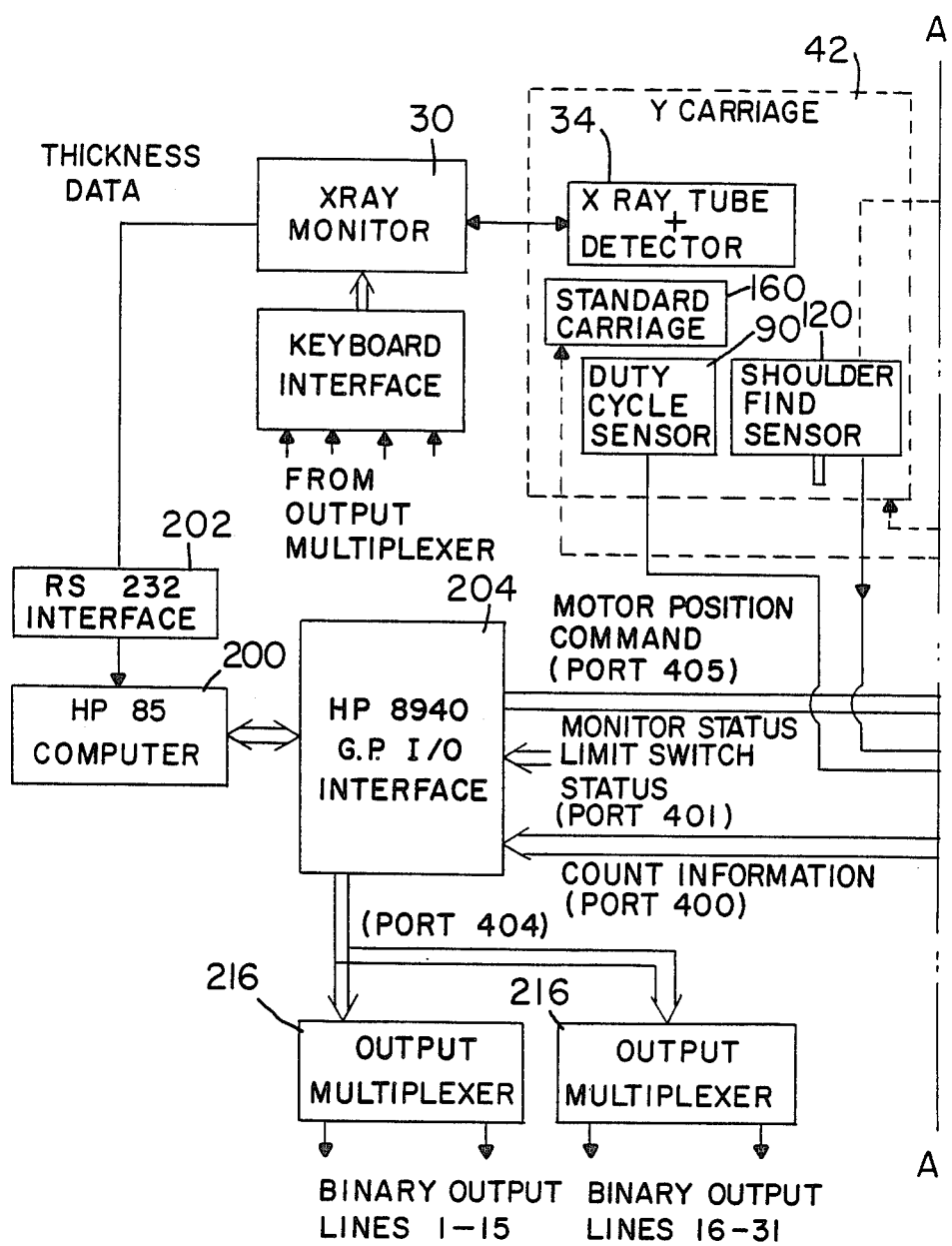
FIG. 9 (which is made up of FIGS. 9A-9C) is a block diagram of the embodiment of FIGS. 1-8.
Figure 9C:
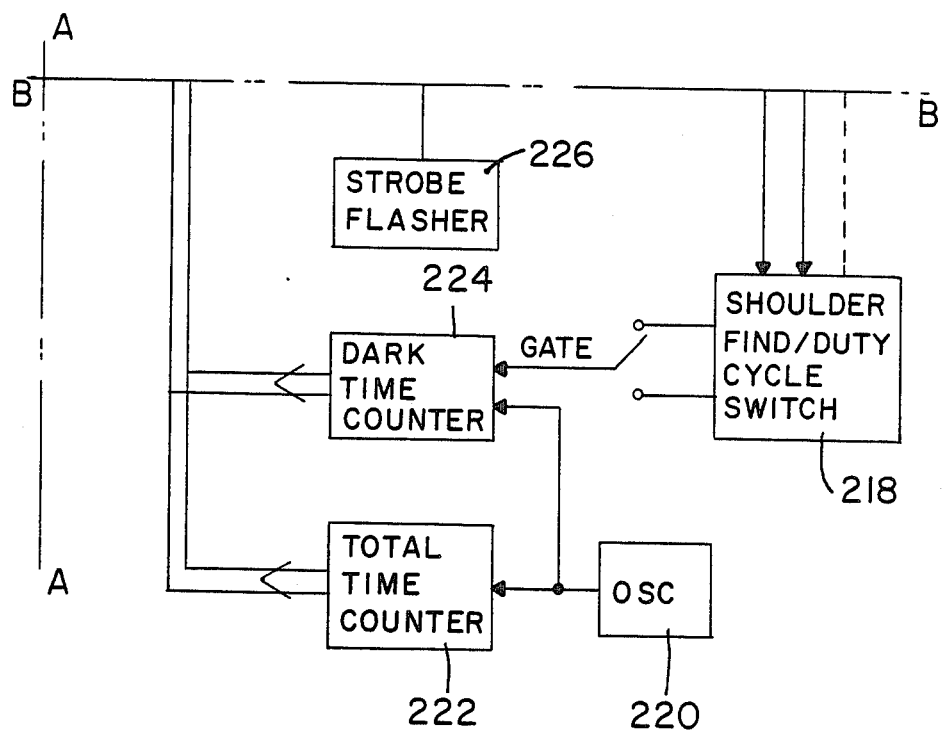

FIG. 9, comprising FIGS. 9A–9C, is a block diagram illustrating functional components of the preferred embodiment. As shown in FIG. 9, this embodiment includes a computer 200 such as a Hewlett Packard HB85 computer. The computer 200 is interconnected with the X-ray thickness monitor 30 via a conventional RS232 interface 202 to enable the computer 200 to receive thickness measurements from the thickness monitor 30. In addition, the computer 200 sends and receives signals to an I/O interface unit 204, such as Hewlett Packard HB8940. This interface unit 204 includes two eight bit input ports 400 and 401, and two eight bit output ports 404 and 405. Input port 400 is used to receive count information from the counters 222, 224 described below. Input port 401 is used to receive status signals which characterize the status of the thickness monitor 30 and the various limit switches described above. Output port 400 is used to control two output multiplexers 216. These multiplexers 216 decode the eight parallel output bits in port 404 into 31 binary output lines. A number of these binary output lines are used to control the X-ray thickness monitor via a keyboard interface unit 217. Finally, output port 405 is used to provide motor position commands to the Y motor 46, the shoulder find motor 142, and the X motor 164.

The sensor signals generated by the duty cycle sensor 90 and the shoulder find sensor 120 are conducted in parallel to a switch 218 which is controlled by the computer 220 to select one of the two sensor signals for use in controlling the dark time counter 224. Both the dark time counter 224 and the total time counter 222 receive clock pulses from an oscillator 220. The total time counter counts these clock pulses during a measurement interval determined by the computer 200, and the dark time counter 224 counts these clock pulses only when the selected one of the sensor signals indicates the presence of a terminal during the measuring period. Thus, the ratio of the counts stored in the dark time counter 224 to the counts stored in the total time counter 222 is a measure of the duty cycle W/D discussed above. These counts are read by the computer 200 via input port 400 under computer control. A strobe flasher 226 is responsive to the sensor signal generated by the duty cycle sensor 90 such that the strobe flasher 226 synchronizes a strobe with the moving terminals.

Motor position commands from port 405 are applied as inputs to an X motor card 230 and a Y motor card 232. The X motor card formats position commands for the X motor 164, and transmits these commands via an adapter 238 to a motor driver 236 which directly controls the operation of the X motor 164. Similarly, the Y motor card 232 formats position commands from the port 405 and applies them via a switch 234 to one of two adapters 238. These two adapters 238 control respective motor drivers 236 which are linked to respective ones of the shoulder find motor 142 and the Y motor 46. The switch 234 is identical to the switch 218 and is used to reduce the required hardware. In practice, the Y motor 46 and the shoulder find motor 142 are never operated simultaneously, and the switch 234 allows the single Y motor card 232 to control both motors 142, 46.

Figure 10B:
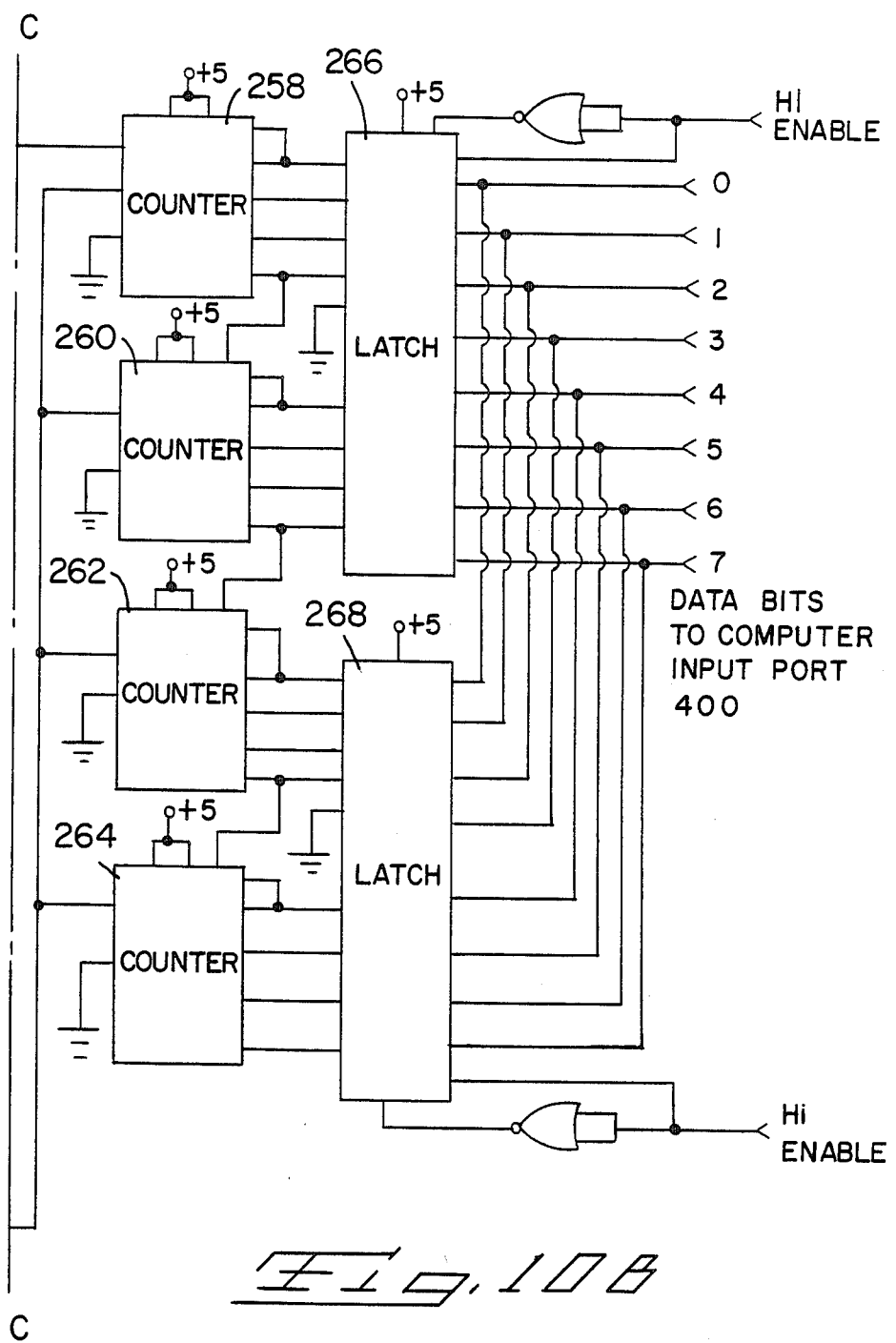
FIG. 10 (which is made up of FIGS. 10A and 10B) is an electrical circuit diagram of a dark time counter included in the embodiment of FIGS. 1-9.

FIG. 10, comprising FIGS. 10A and 10B, shows a detailed schematic diagram of the dark time counter 224. As shown in FIG. 10, the sensor signal from the detector of the selected one of the sensors 90, 120 is applied as an input to an amplifier 240. The amplifier 242 is connected to a variable resistor 241 which provides a variable gain for the amplifier 240. Increased illumination of the selected detector causes the output signal of the amplifier 240 to be driven more negative. The output signal is applied via an analog switch 242 to the non-inverting input of a second amplifier 244. A capacitor 246 is connected between this non-inverting input of the amplifier 244 and ground, and a resistor 248 provides a leakage path to ground for the capacitor 246.

The signal applied to the non-inverting input of the amplifier 244 is also applied to the non-inverting input of a comparator 250. The inverting input of this comparator 250 is connected to the output signal signal generated by the amplifier 240. The output of the comparator 250 is used to control the analog switch 242 such that the switch 242 is closed when the signal generated by the amplifier 240 is more negative than the signal applied as an input to the non-inverting terminal of the amplifier 244.

In practice, this causes the capacitor 246 to store the peak negative value generated by the amplifier 240. The resistor 248 provides a leakage path to ground to assure that the voltage on the capacitor 246 is indicative of the peak negative signal generated by the amplifier 240 in the recent past. The output of the amplifier 244 is applied to a potentiometer 252 which is preferably set such that the signal applied to the non-inverting input of the comparator 254 is approximately 50 percent of the peak negative value stored on the capacitor 246. The signal applied to the non-inverting input of the comparator 254 sets the threshold for the comparator 254. The inverting input of the comparator 254 is connected to receive the signal generated by the amplifier 240.

Elements 240-252 cooperate to form a peak detection circuit which sets the threshold for the comparator 254 at half the peak negative value generated by the amplifier 240, thereby insuring that the comparator 254 switches at the same point in the wave form generated by the selected sensor 90, 120, regardless of the instantaneously prevailing peak amplitude of the sensor signal. In this way, the operation of the dark time counter 224 is made significantly less sensitive to variations in peak amplitude of the sensor signal.

The output signal generated by the comparator 254 is applied to a gate 256, and the output of the gate 256 is connected to the clock input of a first 4-bit counter 258. The gate 256 receives as a second input the clock signal from the oscillator 220 such that the counter 258 is clocked only when a clock pulse from the oscillator 220 arrives during a time period when the selected sensor signal indicates that the respective detector is in the shadow of a terminal. The counter 258 is connected to counters 260, 262 and 264 which cooperate to form a 16 bit counter. The outputs of the counters 258, 260 are applied as inputs to a first 8 bit latch 266, and the outputs of the counters 262, 264 are applied as inputs to a second 8 bit latch 268. The latches 266, 268 are controlled by respective lines from the output multiplexer 216 such that the computer 200 can place the contents of either latch 266 or latch 268 on the input port 400. In addition, the computer can reset the counters 258-264 via a signal applied to the gate 269.

Figure 11A:
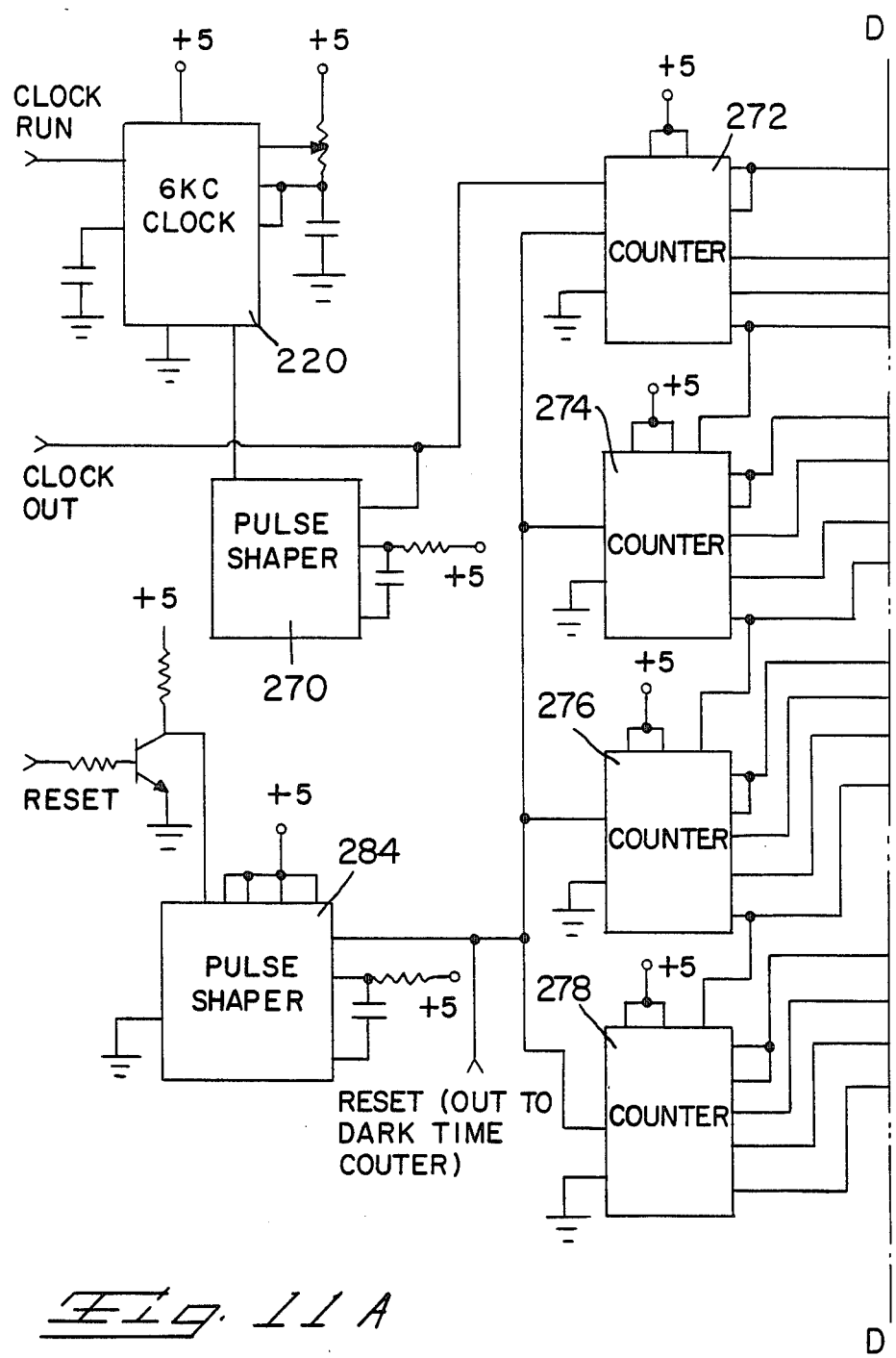
FIG. 11 (which is made up of FIGS. 11A and 11B) is an electrical circuit diagram of a total time counter included in the embodiments of FIGS. 1-9.
Figure 11B:
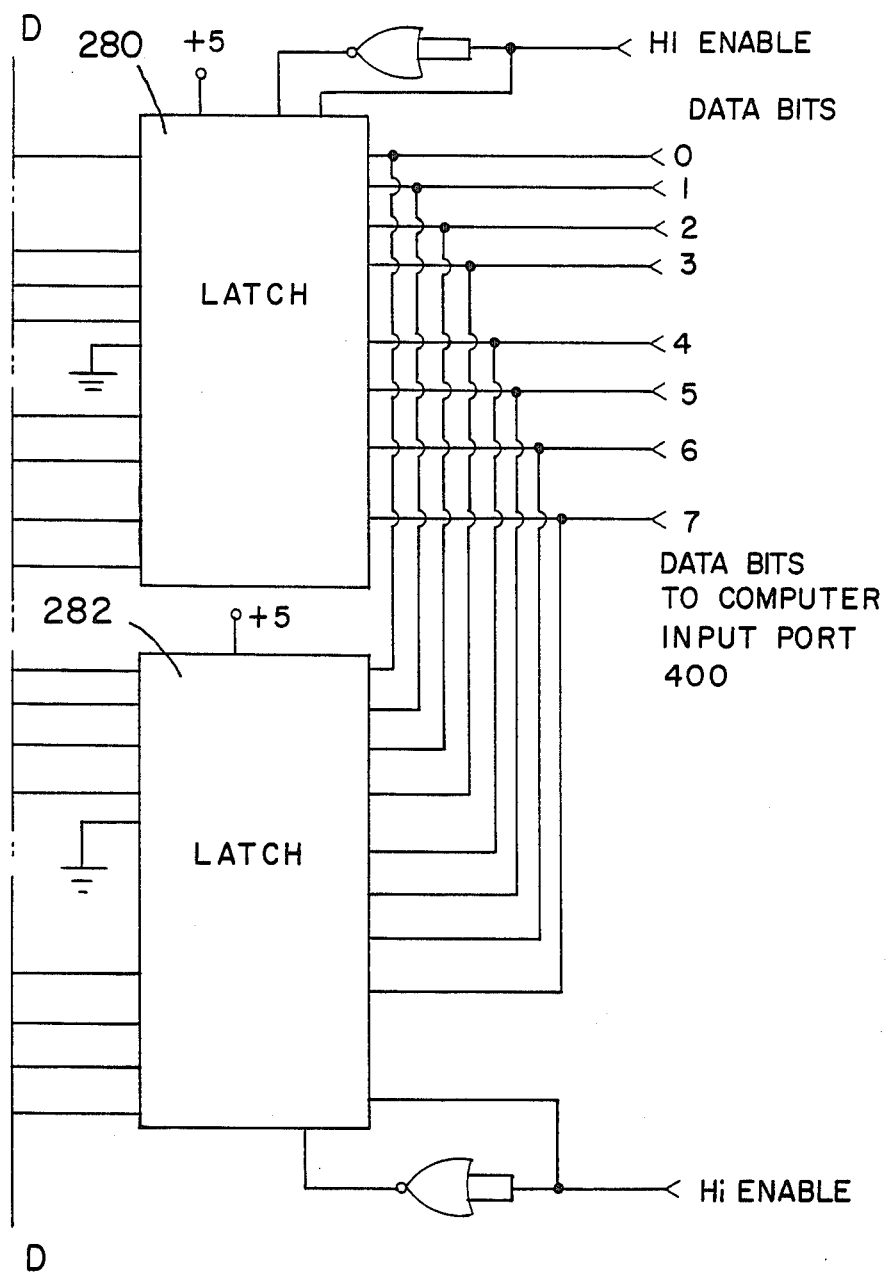

FIG. 11, comprising FIGS. 11A and 11B, shows a detailed schematic diagram of the total time counter 222 and the oscillator 220. As shown in FIG. 11, the oscillator 220 in this embodiment generates a six kilocycle clock signal. This clock signal is applied as an input to a pulse shaping circuit 270, generates a series of pulses having a width of about 10 microseconds. It is these shaped pulses which form the clock signals applied as an input to the dark time counter 224 and to the clock input of a counter 272. The counter 272 is coupled with counters 274, 276, and 278 to form a 16 bit counter. The output signals generated by counters 272 and 274 are applied as inputs to a first latch 280, and the output signals generated by the counters 276, 278 are applied as inputs to a second latch 282. The latches 280, 282 are controlled by the computer 200 in a manner similar to that described above in conjunction with the dark time counter 224 to place the respective latched signals on the input port 400 under computer control.

The computer also generates a reset signal on output 6 of the output multiplexer 216, and this reset signal is applied to a pulse shaping circuit 284. The shaped reset pulse is applied to the reset input of each of the counters 272-278 and is transmitted to the dark time counter 224 to reset the counters 258-264.

In order to make a measurement of duty cycle, the computer first resets the counters in both the total time counter 222 and the dark time counter 224. The appropriate one of the sensor signals is selected via the switch 218 and then the clock 220 is enabled for a measuring period. During the measuring period, the total time counter 222 counts each of the clock pulses and the dark time counter 224 counts each of the clock pulses occuring during the time when the detector of the respective sensor is shadowed by one of the terminals.

Figure 12A:
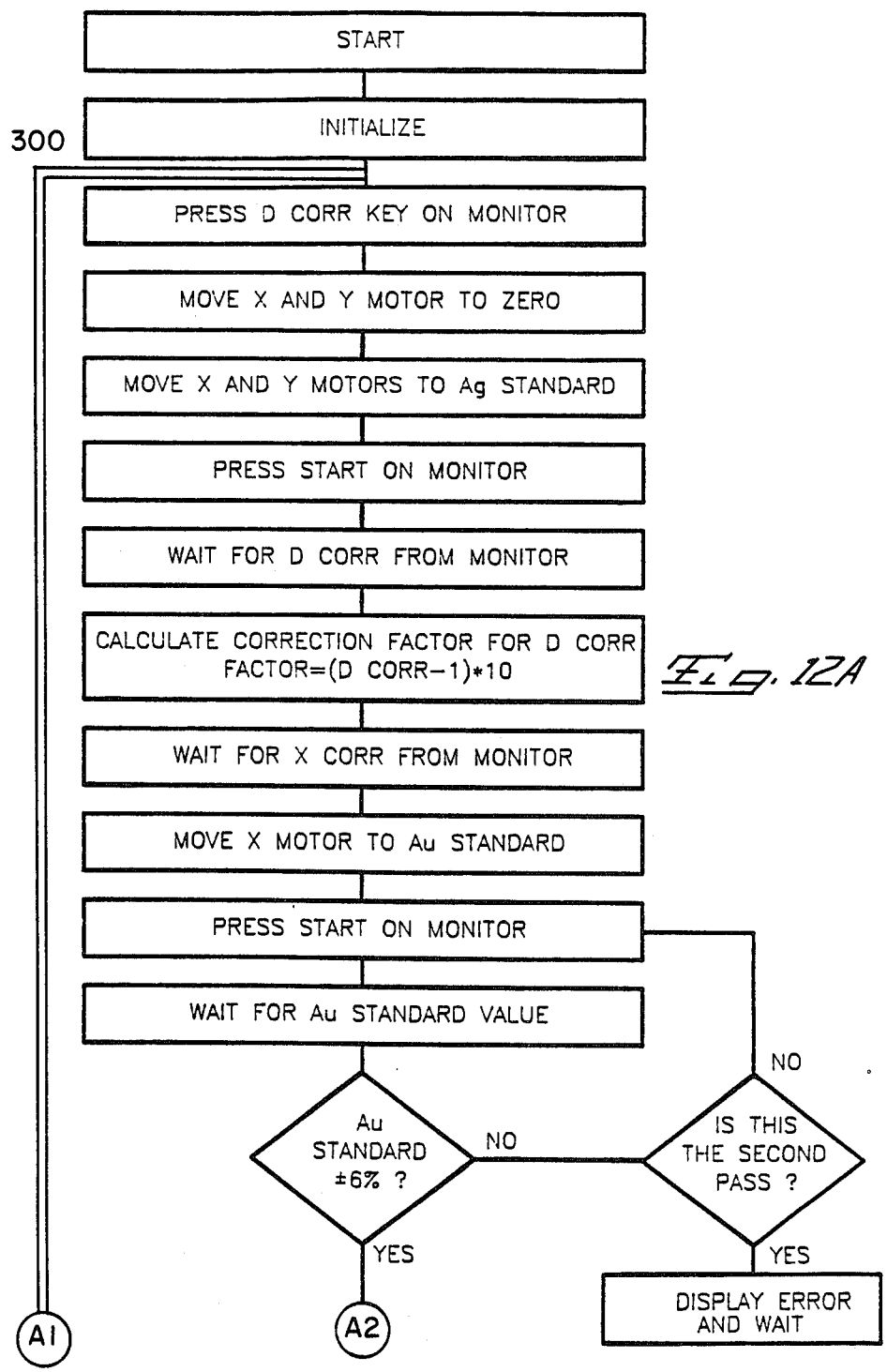
FIGS. 12A-12E make up a flow chart of the program executed by the embodiment of FIGS. 1-9.
Figure 12B:
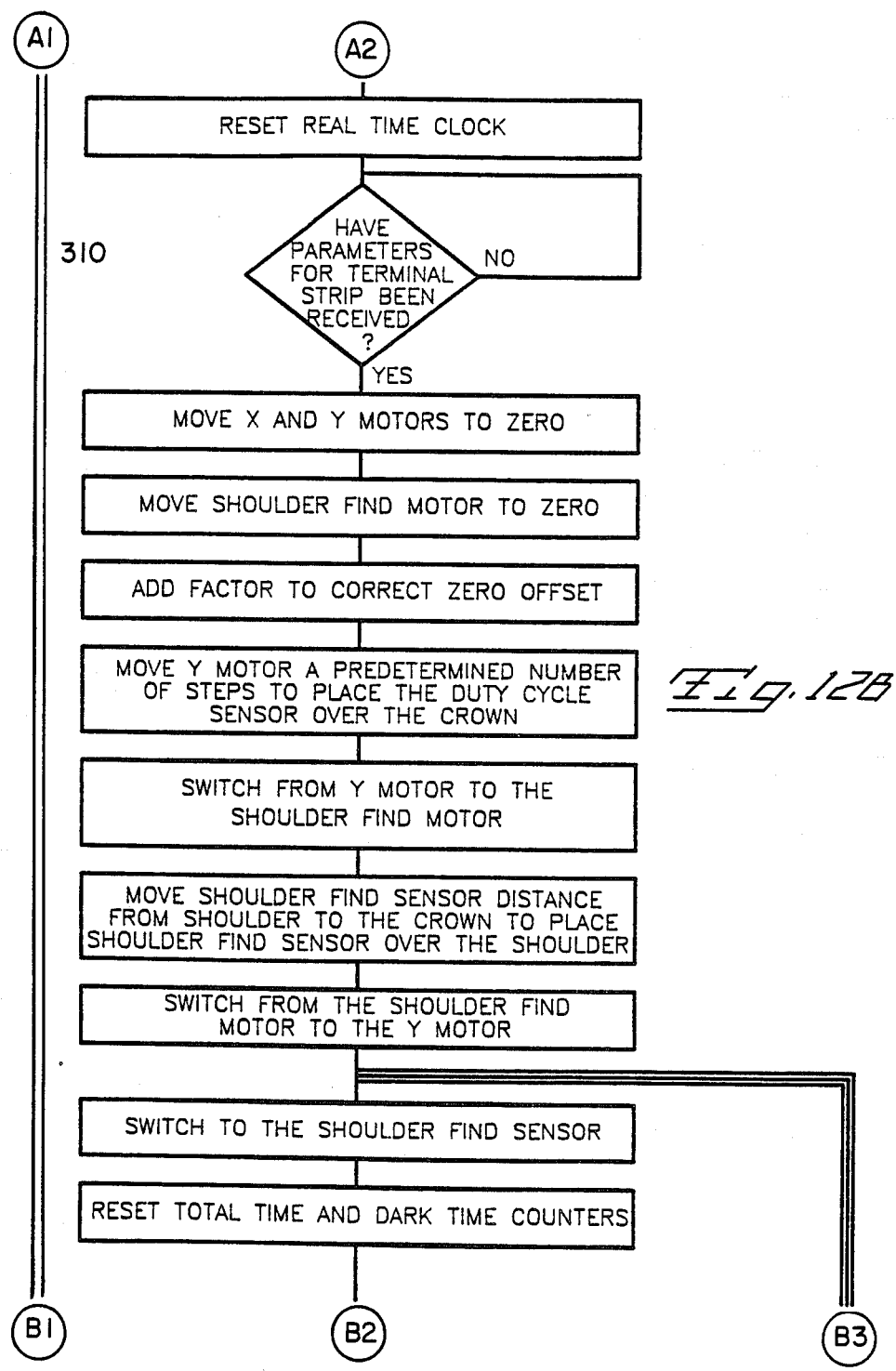
Figure 12C:
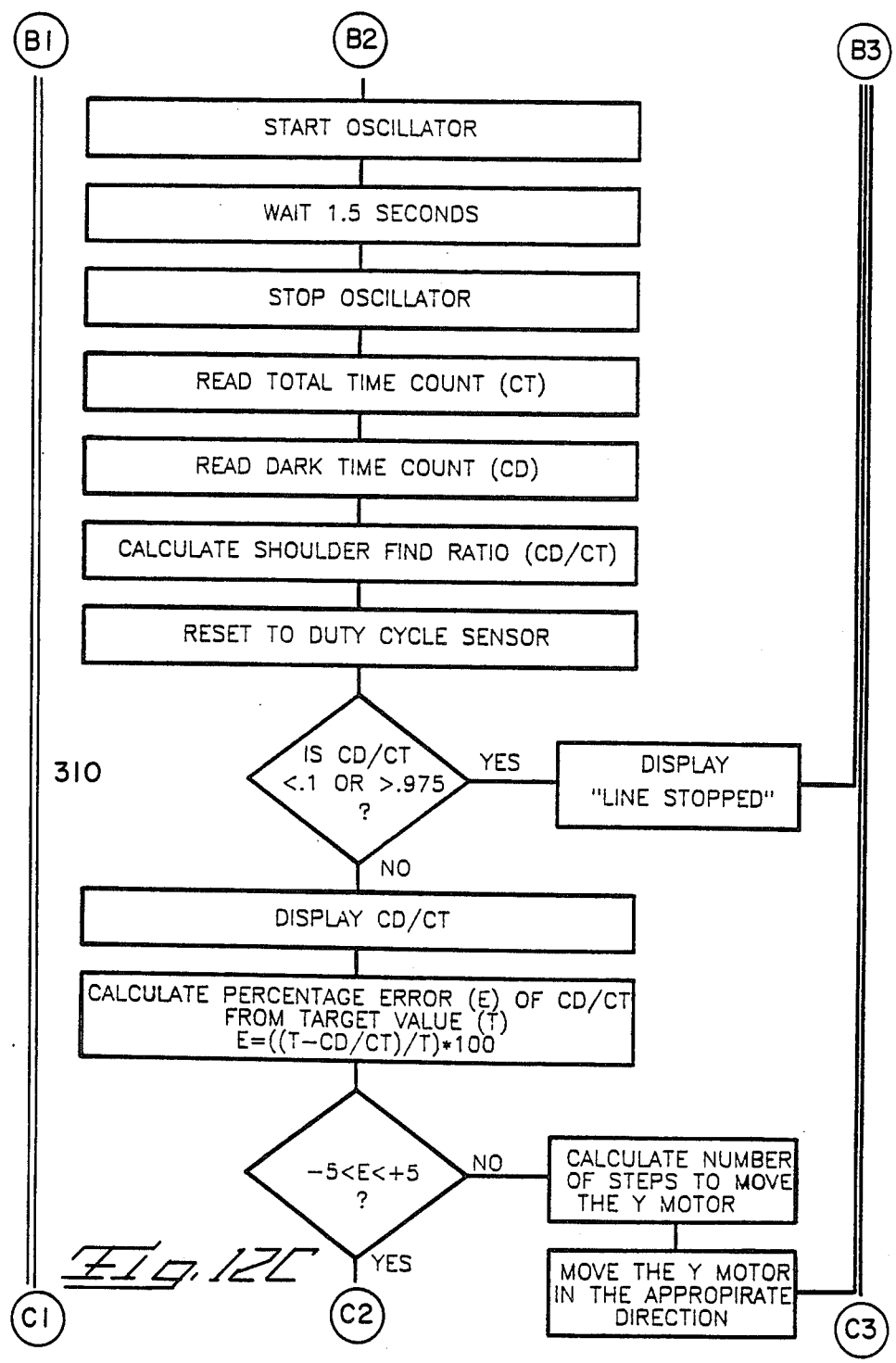
Figure 12D:
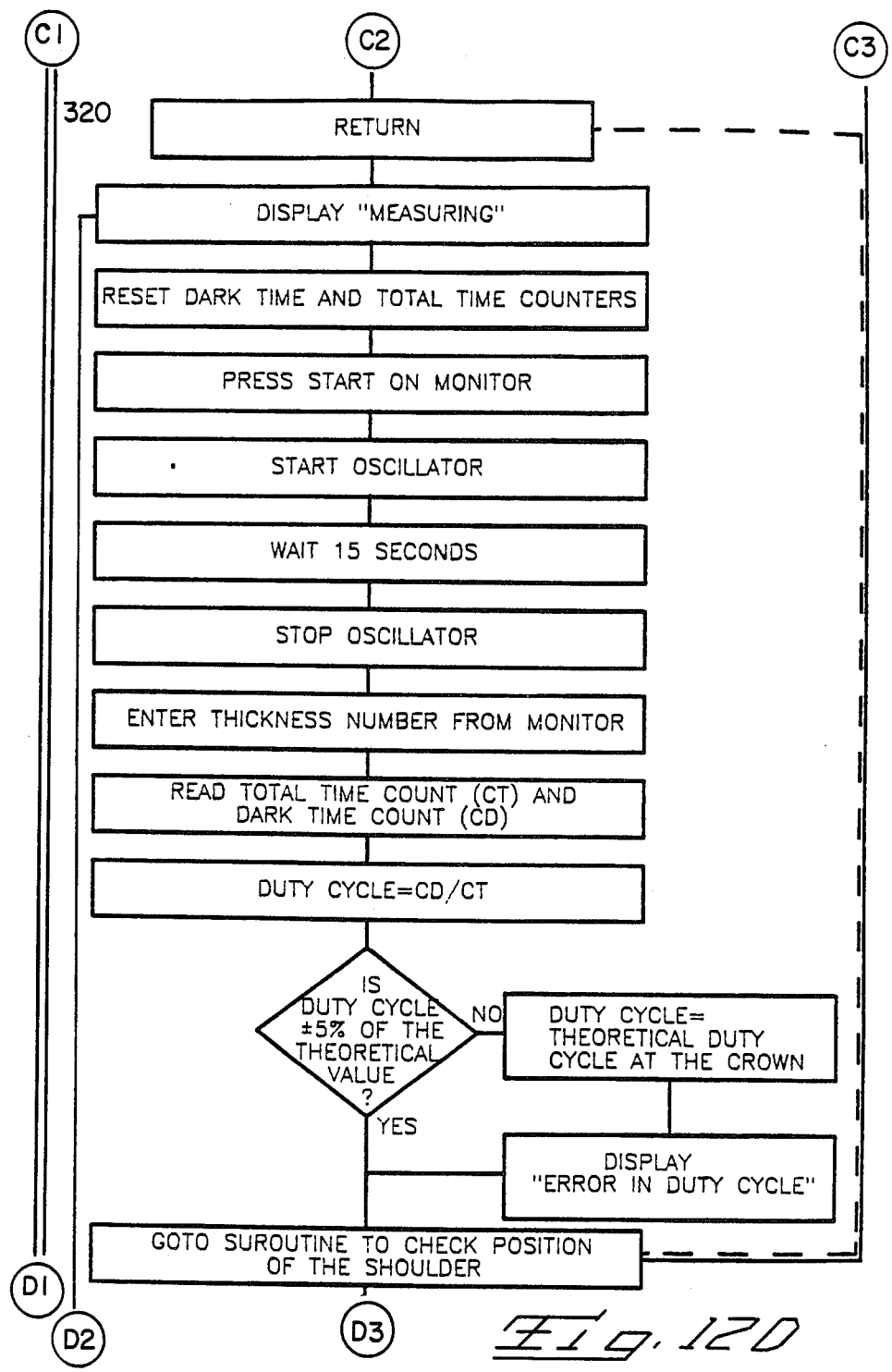
Figure 12E:
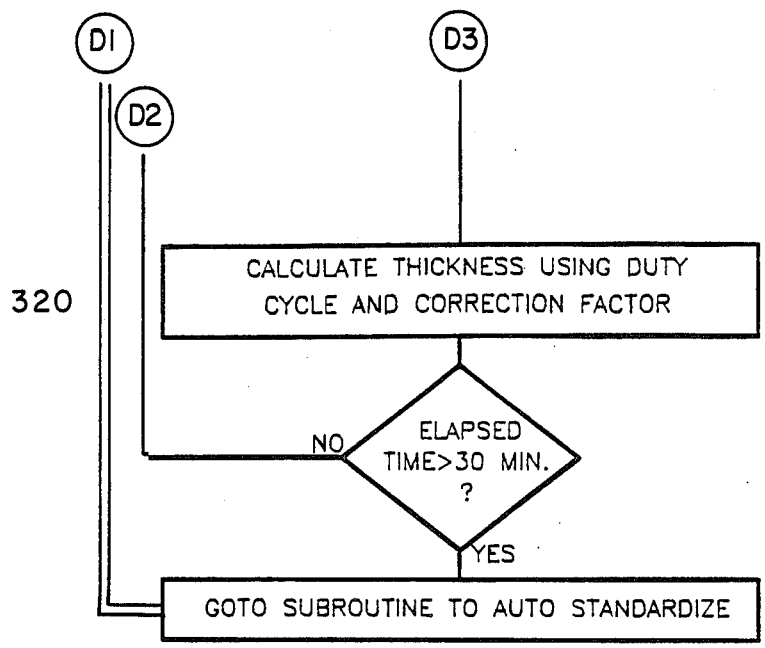

FIGS. 12A-12E present a flowchart of the program executed by the computer 200. After the program has initialized the thickness monitor 30, the program enters a section 300 which standardizes the thickness monitor 30. As shown in FIG. 12a, the program first controls the X and Y motors 164,46 to position the collimator 34 over a pure silver strandard mounted on the standard carriage 160. This is accomplished by driving the X and Y motors to their respective zero positions, defined by respective limit switches. The thickness monitor is then started in the D-correct mode, and the DCORR signal is read from the thickness monitor via the RS232 interface. A correction factor X is then calculated according to the following formula:

$$X = (DCORR - 1) \times 10.$$

The thickness monitor includes conventional means for evaluating the voltage pulses generated by the secondary X-ray detector and for generating the signal DCORR as a function of the measured voltage of the pulses. The correction factor X is used to compensate for variations in detector sensitivity, caused primarily by temperature fluctuations.

The thickness monitor 30 then enters the X correct mode used to check the intensity of the X-ray beam. The program controls the X motor 164 to move the standard carriage 160 to position a standard having a known thickness of gold plating into alignment with the X-ray collimator 34. The thickness monitor 30 is then started and the thickness measurement obtained by the thickness monitor 30 is compared with a known standard value. If the measured value is not within 6 percent of the standard value, the standardizing measurement is repeated. If the measured thickness fails to correspond to the known thickness within 6 percent a second time, an error condition is displayed and monitoring is halted.

Assuming that the measured thickness for the gold standard is within 6 percent of the known thickness, the program then resets a real time clock included in the computer 200 and enters a section 310 of the program in which the shoulder find sensor 120 is positioned accurately over the shoulers 16 of the terminals 14. In the section 310, the first step is to ensure that necessary parameters characteristic of the terminal strip 10 have been received. In this embodiment, these parameters include the nominal distance between the edge 22 of the carrier strip 12 and the shoulder 16, the distance between the shoulder 16 and the crown 20, the target value T for the ratio W/D characteristic of the shoulder 16, the theoretical value for the duty cycle at the crown 20, and the calibration curve to be used by the thickness monitor 30. Preferably, the target value T is set equal to the duty cycle of the wider portion of the shoulder multiplied by the factor 0.903.

Once these parameters have been received, the program positions the X, Y and shoulder find motors to zero and then moves the Y motor a pre-determined number of steps to place the duty cycle sensor 90 approximately over the crown 20. This pre-determined number of steps is equal to the sum of the previously received distance between the edge 22 and the crown 20 and a stored zero correction. Then the shoulder find sensor 120 is moved a distance equal to the separation between the shoulder 16 and the crown 20 in order to place the shoulder find sensor 120 approximately over the shoulder 16. After these movements have been accomplished, both the X-ray beam 36 and the duty cycle sensor 90 are positioned to scan the crown 20, and the shoulder find sensor 120 is positioned to scan the shoulder 16.

The switch 218 is then controlled to cause the dark time counter 224 to respond to the shoulder find sensor 120 and the total time and dark time counters are reset. The oscillator 220 is then started and run for a period of 1.5 seconds before it is stopped. The total time count CT stored in the total time counter 222 and the dark time count CD stored in the dark time counter 224 are then read and the shoulder find ratio CD/CT is calculated. If this ratio CD/CT is less than 0.1 or greater than 0.975, the program displays the message, "Line Stopped" and returns to measure the ratio CD/CT. Otherwise the measured ratio CD/CT is displayed and a percentage error E between CD/CT and the target value T is calculated according to the following formula:

$$E = (T - CD/CT) \times 100 \times 1/T.$$

If this percentage error E is within the range of plus or minus 5, the shoulder find sensor 120 is considered to be properly centered on the shoulder 16. If the ratio E is outside of this range, the program calculates the number of steps required to move the Y carriage 42 to make the measured ratio CD/CT equal to the target value T. In this embodiment, one step of the Y motor 46 causes the Y carriage 42 to move 0.001 inch, one step of the X motor 164 causes the standard carriage 160 to move 0.001 inch, and eight steps of the shoulder find motor 142 cause the shoulder find motor sensor 120 to move 0.001 inch. It has been found that moving the Y motor 46 by a number of steps equal to 0.2×E causes the measured ratio CD/CT at the shoulder 16 to approach the target value T.

Once the shoulder find sensor 120 has been positioned properly over the shoulder 16, the program then enters a section 320 in which the duty cycle at the crown 20 is measured and used to correct the thickness measurement obtained with the thickness monitor 30. In the section 320, the Measuring indicator is illuminated. The dark time and total time counters 222,224 are reset, thickness monitor 30 is initiated in a thickness measurement and the oscillator 220 is started. After a 15 second interval (which is typically less than the time required for the thickness monitor 30 to complete a thickness measurement), the oscillator 220 is stopped. During this 15 second interval the dark time counter 224 responds to the duty cycle sensor 90. The measured thickness is then read from the thickness monitor 30 and the total time count CT and the dark time count CD are read from the respective counters 222,224. The duty cycle is then set equal to the calculated ratio CD/CT and the duty cycle is compared with a theoretical value characteristic of the crown 20. If the measured duty cycle is not within 5 percent of the theoretical value, the duty cycle is set equal to the theoretical value and an error message is displayed.

The section 310 of the program is then executed again to check the shoulder position, and then the measured thickness value is corrected using the duty cycle and the previously determined correction factor X. In this embodiment, the corrected thickness is set equal to the sum of (the measured thickness divided by the duty cycle) and the correction factor X. As explained above, because the gaps 18 between the crowns 20 reduce the X-ray intensity measured by the thickness monitor 30, the measured thickness is less than the actual thickness of the plating layer on the crown 20 by a factor proportional to the duty cycle. By dividing the measured thickness by the duty cycle, the corrected thickness is made independent of the size of the gaps 18. The elapsed time is then checked, and if it is greater than 30 minutes, the standardizing routine 300 is again executed. Otherwise the program continues to monitor shoulder position duty cycle at the crown 20 and thickness as described above.

From the foregoing, it should be apparent that an improved thickness monitor has been described which automatically compensates the thickness measurement for variations in geometry of the measured terminals and which positions the X-ray beam properly over the crowns in an automatic and reliable manner. Furthermore, this system automatically accomplishes a standardization of the thickness monitor on a periodic basis, without operator intervention. All of this is achieved in a real time monitor which provides rapid and accurate monitoring of the plating thickness such that plating layers which are out of tolerance are recognized promptly and waste and delay is minimized.

The foregoing detailed description describes the preferred embodiment in complete functional detail. However, in order to better define this preferred embodiment, the appendices listed in Table 1 are attached hereto. These appendices include a listing of the program flowcharted in FIGS. 12A–12E and the schematic diagrams for certain components. The remaining components are standard commercially available items. For example, the motors and motor drivers in this embodiment are SLO/SYN translator modules type STM101 manufactured by the Superior Electric Company of Crystal, Conn. Suitable translation stages can be obtained from Daedal and the lamp and detector assemblies used in duty cycle sensor and the shoulder find sensor can be obtained from Scan-O-Matic as part numbers S58101 and P56001.

TABLE 1

| Appendix 1 | Description |
|---|---|
| 1 | Listing in HPBASIC of program flowcharted in FIGS. 12A–12E |
| 2 | Schematic Diagram For Adapter 238 |
| 3 | Schematic Diagram For Switch 237, 218 |
| 4 | Schematic Diagram For Motor Cards 232, 230 |
| 5 | Schematic Diagram For Dark Time Counter 224 |
| 6 | Schematic Diagram For Total Time Counter 222 and Oscillator 220 |
| 7 and 8 | Schematic Diagram For Multiplexers 216 |
| 9 | Schematic Diagram For Keyboard Interface 217 |
| 10 | Table of Multiplexer output signals |

Of course, it should be understood that a wide range of changes and modifications can be made to the preferred embodiments described above. For example, the precise design of the means for sensing the terminal strip can be varied widely. In addition to the optical sensors described above, capacitive, magnetic, and inductive sensors may well be suitable in alternative applications. When optical sensors are used, the wave length of the sensing beam can be chosen as appropriate for the particular application, and can include ultraviolet, infrared, and visible sensing beams. Furthermore, it is not necessary in all embodiments that the terminal strip pass between the light source and detector, and in some applications it may be preferable to reflect the sensing beam from the lamp off of the terminal strip onto the detector. Of course, lens systems or laser beams can be substituted for the fiber optic arrangements discussed above. In some applications, it may even be preferable to substitute an X-ray sensor to sense the X-ray beam 36 in order to measure the width of the gaps between the terminals. Furthermore, the particular ratios used to determined the duty cycle may well be varied in alternate applications. Instead of the ratio W/D discussed above, the ratio W/G or D/W or other related ratios may be more suitable for certain applications.

This invention is not limited to use with X-ray thickness measuring systems, but is also suitable for other types of measuring and control systems. For example, in plating operations the ratio between the width W of the crown and the distance D between adjacent crowns influences the area of metal to be plated and therefore various parameters of the plating process. The duty cycle sensor described above can readily be adapted to automatic control of a plating operation.

When the present invention is used in conjunction with a thickness measuring system, it is possible to compensate the thickness measurement by extending the measuring time rather than by multiplying the measured thickness obtained with a pre-set measuring time by a duty cycle correction factor. If this alternate approach is used, it may be preferable to use the duty cycle sensor to ensure that the measuring time is gated to start at or near the leading edge of each crown.

It is therefore intended that the foregoing detailed description be regarded as illustrative rather than limiting, and that it be understood that it is the following claims, including all equivalents, which are intended to define the scope of this invention.

What is claimed is:

1. In a system of monitoring a plurality of components spaced in an array along an axis, each component including at least a portion having a leading edge and a trailing edge along the axis defining a width of the component portion, the improvement comprising:

a sensor including a signal generator and a signal detector and positioned adjacent to the components to generate a sensor signal which is in a first state when the component portion of any one of the components is present at a selected location and is in a second state when no portion of any one of the components is present at the selected location;

means for creating relative movement along a transport axis between the sensor and the components such that multiple ones of the components successively move across the selected location; and means associated with the signal detector and responsive to detection thereby of the sensor signal for generating an additional signal which varies in accordance with the width of the component portion parallel to the transport axis, including means for generating a duty cycle signal indicative of the proportion of a measuring interval during which the sensor signal is in the first state, comprising clock means for generating a series of clock pulses, means for counting the clock pulses during the measuring interval to determine a first count, means for counting the clock pulses during the measuring interval when the sensor signal is in the first state to determine a second count, and means for setting the duty cycle signal as a function of a ratio of the first count to the second count.

2. In a thickness monitor comprising means for passing an array of spaced components, separated by gaps, along a transport axis, means for generating a radiation beam oriented to strike the components as they move along the transport axis, and means for detecting secondary radiation emitted by the components in response to the radiation beam and for generating a detection signal in response thereto, the improvement comprising:
 a sensor positioned adjacent to the transport axis to generate a sensor signal which is in a first state when any one of the components is present at a selected location along the transport axis and which is in a second state when none of the components is present at the selected location; and
 means, responsive to the sensor signal, for generating a corrected detection signal to compensate the detection signal for the gaps between adjacent ones of the components such that the corrected detection signal is substantially independent of the width of the gaps along the transport axis.

3. The invention of claim 2 wherein the radiation beam comprises an X-ray beam.

4. The invention of claim 2 wherein the sensor comprises:
 means for directing a light beam at the components at the selected location; and
 means for detecting the light beam as modulated by the components and for generating the sensor signal in response thereto.

5. The invention of claim 2 wherein the means for generating a corrected detection signal comprises:
 means for measuring a duty cycle factor indicative of the proportion of time the sensor signal is in the first state during a measuring interval; and
 means for correcting the detection signal by the duty cycle factor.

6. The invention of claim 5 wherein the means for measuring the duty cycle factor comprises:
 an oscillator which generates a series of clock pulses;
 means for counting the clock pulses during the measurement interval to determine a first count;
 means for counting the clock pulses during the measurement interval when the sensor signal is in the first state to determine a second count; and
 means for setting the duty cycle factor as a function of the ratio of the second count to the first count.

7. The invention of claim 5 wherein the correcting means comprises means for multiplying the detection signal by the duty cycle factor.

8. The invention of claim 2 wherein the selected location is aligned with the radiation beam such that the radiation beam and the selected location define a plane oriented parallel to the transport axis.

9. The invention of claim 2 wherein said components of said array are mounted at one end to a continuous strip member and said monitoring system further includes positioning means for positioning said strip member at a precise location with respect to said radiation beam, said positioning means comprising:
 roller means positioned along the transport axis to position an edge of the strip member at said precise location with respect to the radiation beam, said roller means including at least one roller having a sloped surface and a flange at the uppermost edge of the sloped surface whereby the edge of the strip member is caused to seat firmly against the flange thus establishing a reliable and reproducable reference surface for the radiation beam.

10. In a thickness monitor comprising means for passing an array of spaced components, separated by gaps, along a transport axis, means for generating a radiation beam oriented to strike the components as they move along the transport axis, and means for detecting secondary radiation emitted by the components in response to the radiation beam and for generating a detection signal in response thereto, the improvement comprising:
 a sensor positioned adjacent to the transport axis to generate a sensor signal which transitions from a first state to a second state as a leading edge of each of the components passes a selected location along the transport axis; and
 means, responsive to the sensor signal, for compensating the detection signal for the gaps between adjacent ones of the components such that the compensated detection signal is substantially independent of the width of the gaps along the transport axis.

11. The invention of claim 10 wherein the radiation beam comprises an X-ray beam.

12. The invention of claim 10 wherein the sensor comprises:
 means for directing a light beam at the components at the selected location; and
 means for detecting the light beam as modulated by the components and for generating the sensor signal in response thereto.

13. The invention of claim 10 wherein the selected location is aligned with the radiation beam such that the radiation beam and the selected location define a plane oriented parallel to the transport axis.

14. The invention of claim 10 wherein said components of said array are mounted at one end to a continuous strip member and said monitoring system further includes positioning means for positioning said strip member at a precise location with respect to said radiation beam, said positioning means comprising:
 roller means positioned along the transport axis to position an edge of the strip member at said precise location with respect to the radiation beam, said roller means including at least one roller having a sloped surface and a flange at the uppermost edge of the sloped surface whereby the edge of the strip member is caused to seat firmly against the flange thus establishing a reliable and reproducable reference surface for the radiation beam.

15. The invention of claim 16 wherein said components of said array are mounted at one end to a continuous strip member and said monitoring system further includes positioning means for positioning said strip member at a precise location with respect to a monitoring means, said positioning means comprising:
 roller means positioned along the transport axis to position an edge of the strip member at said precise location with respect to the monitoring means, said roller means including at least one roller having a sloped surface and a flange at the uppermost edge of the sloped surface whereby the edge of the strip member is caused to seat firmly against the flange thus establishing a reliable and reproducable reference surface for the monitoring means.

16. In a monitor comprising means for passing an array of spaced components along a transport axis, and means for monitoring the components at a monitoring point as they move along the transport axis, the improvement comprising:

sensor means for generating a sensor signal indicative of a measured width of the components in a selected direction at a sensing point;

means for comparing the sensor signal with a stored signal indicative of a target width and for generating a control signal in response to the comparison;

first means for moving the sensing point along the components in response to the control signal to cause the measured width to approach the target width, thereby automatically maintaining the sensing point at a first selected location on the components; and second means for moving the monitoring point to maintain a selected separation between the monitoring point and the sensing point, thereby automatically maintaining the monitoring point at a second selected location on the components.

17. The invention of claim 16 wherein the monitoring means further comprises means for directing an X-ray beam at the monitoring point to measure a thickness parameter of the spaced components.

18. The invention of claim 16 wherein the selected direction is parallel to the transport axis and wherein the first moving means moves the sensing point transverse to the transport axis.

19. The invention of claim 16 wherein each of the components includes a respective shoulder and wherein the target width is selected to cause the first moving means to align the sensing point with the shoulder.

20. The invention of claim 19 wherein the first moving means moves the sensing point along a translation axis and wherein the monitoring point is separated from the sensing point by a selected distance along the translation axis.

21. The invention of claim 16 wherein the second moving means comprises means for rigidly securing the monitoring means in place with respect to the sensor means such that the sensor means and the monitoring means move as a unit.

22. The invention of claim 16 wherein the sensor means comprises:

light source means for directing a light beam at the components at the sensing point; and light detector means for sensing the light beam as modulated by the components.

23. In an X-ray thickness monitor comprising means for passing an array of space components along a transport axis, wherein each of the components defines a length dimension oriented transversely to the transport axis, means for generating an X-ray beam oriented to strike successive ones of the components at a first selected point along the length dimension as they move along the transport axis, and means for detecting secondary X-rays emitted by the components in response to the X-ray beam, the improvement comprising:

a carriage guided for movement parallel to the length dimension and situated near the transport axis;

sensor means, mounted on the carriage, for generating a sensor signal indicative of a measured width of the components at a second selected point along the length dimension, said measured width oriented in a width dimension parallel to the transport axis;

means for mounting the X-ray beam generating means on the carriage to maintain a selected separation along the length dimension between the first and second selected points;

means for comparing the sensor signal with a stored signal indicative of a target width and for generating a control signal in response to the comparison; and means for moving the carriage in response to the control signal to cause the measured width to approach the target width, thereby automatically maintaining the first and second selected points at respective pre-determined locations on the components.

24. The invention of claim 23 wherein each of the components includes a respective shoulder, and wherein the target width is selected to cause the moving means to align the second selected point with the shoulders of the components.

25. The invention of claim 23 wherein the sensor means comprises:

light source means for directing a light beam at the components at the second selected point; and light detector means for sensing the light beam as modulated by the components.

26. The invention of claim 23 wherein said components of said array are mounted at one end to a continuous strip member and said monitoring system further includes positioning means for positioning said strip member at a precise location with respect to an x-ray beam, said positioning means comprising:

roller means positioned along the transport axis to position an edge of the strip member at said precise location with respect to the x-ray beam, said roller means including at least one roller having a sloped surface and a flange at the uppermost edge of the sloped surface whereby the edge of the strip member is caused to seat firmly against the flange thus establishing a reliable and reproducable reference surface for the x-ray beam.

27. In an X-ray thickness monitor comprising means for transporting an array of plated components past a measuring station, means for generating an X-ray beam directed at the components in the measuring station, and means for detecting secondary X-rays emitted by the components in response to the X-ray beam and for generating a thickness signal as a measure of the thickness of a plated layer on the components, the improvement comprising:

at least one X-ray standard means;

means for automatically and periodically aligning the X-ray beam with the X-ray standard in a standardizing operation to obtain a measured thickness value;

means for storing a standard value;

means for automatically comparing the measured thickness value with the standard value during the standardizing operation and for generating a comparison signal indicative of the comparison; and means for indicating an error condition in the event the comparison signal indicates an excessive discrepancy between the measured thickness value and the standard value.

28. The invention of claim 27 wherein the aligning means comprises:
- a first carriage which supports the X-ray beam generating means for movement in a first direction;
- a second carriage which supports the X-ray standard for movement in a second direction, angled with respect to the first direction; and
- means for moving the first and second carriages to bring the X-ray beam in alignment with the X-ray standard during the standardizing operation.

29. The invention of claim 27 wherein said components of said array are mounted at one end to a continuous strip member and said monitoring system further includes positioning means for positioning said strip member at a precise location with respect to an x-ray beam, said positioning means comprising:
- roller means positioned along the transport axis to position an edge of the strip member at said precise location with respect to the x-ray beam, said roller means including at least one roller having a sloped surface and a flange at the uppermost edge of the sloped surface whereby the edge of the strip member is caused to seat firmly against the flange thus establishing a reliable and reproducable reference surface of the x-ray beam.

30. In a monitor comprising means for passing a strip along a transport axis, and means for monitoring the strip at a monitoring point as it moves along the transport axis, the improvement comprising:
- sensor means for generating a sensor signal indicative of the position of a sensing point with respect to a selected feature of the strip;
- first means for moving the sensor means across the strip in response to the sensor signal to automatically maintain the sensing point in alignment with the selected feature; and
- second means for moving the monitoring point to maintain a selected separation between the monitoring point and the sensing point across the strip, thereby automatically maintaining the monitoring point at a selected location on the strip.

31. The invention of claim 30 wherein the monitoring means comprises means for directing an X-ray beam at the monitoring point to measure a thickness parameter of the strip.

32. The invention of claim 30 wherein the first moving means moves the sensing point transverse to the transport axis.

33. The invention of claim 30 wherein the first moving means moves the sensing point along a translation axis and wherein the monitoring point is separated from the sensing point by a selected distance along the translation axis.

34. The invention of claim 30 wherein the second moving means comprises means for rigidly securing the monitoring means in place with respect to the sensor means such that the sensor means and the monitoring means move as a unit.

35. In a system for monitoring an array of spaced components mounted at one end to a continuous strip member, each component including at least a portion having a leading edge and a trailing edge along the axis defining a width of the component portion, the improvement comprising:
- a sensor positioned adjacent to the components to generate a sensor signal which is in a first state when the component portion of any one of the components is present at a selected location and is in a second state when no portion of any one of the components is present at the selected location;
- means for creating relative movement along a transport axis between the sensor and the components such that multiple ones of the components successively move across the selected location;
- means responsive to the sensor signal for generating an additional signal which varies in accordance with the width of the component portion parallel to the transport axis; and
- positioning means for positioning said strip member at a precise location with respect to a monitoring means of the system, the positioning means comprising roller means positioned along the transport axis to position an edge of the strip member at said precise location with respect to the monitoring means, the roller means including at least one roller having a sloped surface and a flange at the uppermost edge of the sloped surface whereby the edge of the strip member is caused to seat firmly against the flange thus establishing a reliable and reproducible reference surface for the monitoring means.

* * * * *